(12) United States Patent
Michaels, Jr.

(10) Patent No.: US 7,483,501 B1
(45) Date of Patent: Jan. 27, 2009

(54) SYSTEM AND METHOD FOR RADIO RECEIVER RF BACKGROUND NOISE ESTIMATION

(75) Inventor: Paul A. Michaels, Jr., Neptune, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 564 days.

(21) Appl. No.: 10/778,705

(22) Filed: Feb. 13, 2004

(51) Int. Cl.
*H03D 1/04* (2006.01)

(52) U.S. Cl. .................. 375/346; 375/227; 375/284; 375/296; 455/67.13

(58) Field of Classification Search ............... 375/346, 375/130, 140, 146, 316; 342/13, 175, 195, 342/450; 455/84
See application file for complete search history.

(56) References Cited

U.S. PATENT DOCUMENTS

| | | | |
|---|---|---|---|
| 4,454,513 A | 6/1984 | Russell | |
| 4,581,767 A | 4/1986 | Monsen | |
| 4,754,278 A | 6/1988 | Fazio et al. | |
| 5,012,251 A | 4/1991 | Kennedy et al. | |
| 5,313,209 A | 5/1994 | Michaels, Jr. et al. | |
| 5,469,171 A | 11/1995 | Earl et al. | |
| 5,710,758 A * | 1/1998 | Soliman et al. | 370/241 |
| 5,809,090 A * | 9/1998 | Buternowsky et al. | 375/347 |
| 5,886,626 A | 3/1999 | Hynes et al. | |
| 5,909,645 A * | 6/1999 | Abramsky et al. | 455/249.1 |
| 5,940,033 A | 8/1999 | Locher et al. | |
| 6,232,909 B1 * | 5/2001 | Masciulli | 342/13 |
| 6,810,246 B1 * | 10/2004 | Kalofonos et al. | 455/423 |
| 2004/0228425 A1 * | 11/2004 | Peeters et al. | 375/346 |

* cited by examiner

*Primary Examiner*—Shuwang Liu
*Assistant Examiner*—Kabir A Timory
(74) *Attorney, Agent, or Firm*—Edward L. Stolarun; Guy M. Miller

(57) ABSTRACT

A system and method of estimating radio frequency (RF) background noise in a radio receiver system comprises determining a total receiver front-end noise based on a noise equivalent receiver bandwidth; estimating external noise associated with the radio receiver system; determining internal noise associated with the radio receiver system from a known noise value; combining the external noise with the internal noise; determining an absolute external (RF) background noise floor associated with the radio receiver system; estimating an out of band noise contribution based on radio receiver selectivity and known received noise levels of out of band sources; and generating a (RF) noise estimate in the radio receiver system based on the above steps. The invention utilizes the (RF) noise estimate to form a (RF) receiver signal to noise ratio enabling an estimate performance of (RF) radio links in the radio receiver system operating in a benign and hostile (RF) environment.

3 Claims, 21 Drawing Sheets

Figure 1(b)

```
┌─────────────────────────────────────────┐
│ Utilizing the radio frequency noise     │
│ estimate to form a radio frequency       │── 164
│ receiver signal to noise ratio.          │
└─────────────────────────────────────────┘
                    │
                    ▼
┌─────────────────────────────────────────┐
│ Verifying the range of reasonableness of │── 166
│ the signal to noise ratio.               │
└─────────────────────────────────────────┘
```

Figure 1(c)

```
┌─────────────────────────────────────────┐
│ Utilizing the selectivity value of the   │── 170
│ radio receiver system.                   │
└─────────────────────────────────────────┘
                    │
                    ▼
┌─────────────────────────────────────────┐
│ Utilizing known input noise values of    │── 172
│ radio frequency sources.                 │
└─────────────────────────────────────────┘
                    │
                    ▼
┌─────────────────────────────────────────┐
│ Combining the selectivity value and the  │
│ known input noise values to generate the │── 174
│ radio frequency noise estimate in the    │
│ radio receiver system.                   │
└─────────────────────────────────────────┘
```

Figure 1(d)

```
┌─────────────────────────────────────────┐
│ Identifying a type of radio system       │── 180
│ characteristic of the radio frequency    │
│ noise estimate.                          │
└─────────────────────────────────────────┘
                    │
                    ▼
┌─────────────────────────────────────────┐
│ Utilizing a noise temperature value      │── 182
│ associated with an amplifier in the      │
│ radio receiver system.                   │
└─────────────────────────────────────────┘
                    │
                    ▼
┌─────────────────────────────────────────┐
│ Utilizing an antenna and cable loss      │── 184
│ value in the radio receiver system.      │
└─────────────────────────────────────────┘
```

SYSTEM AND METHOD FOR RADIO RECEIVER RF BACKGROUND NOISE ESTIMATION

GOVERNMENT INTEREST

The invention described herein may be manufactured, used, and/or licensed by or for the United States Government.

BACKGROUND OF THE INVENTION

Field of the Invention

The invention generally relates to electromagnetic signal analysis, and more particularly to estimating the expected performance of radio frequency signals in various radio frequency environments.

DESCRIPTION OF THE RELATED ART

In many conventional computer program models, which are used to make an estimate of the expected performance of a given communications system operating in a real world radio frequency (RF) environment or in the presence of intentional or unintentional interference, a receiver signal to noise ratio (S/N) is first calculated. This is usually performed by first locating the transmitter on a digital terrain surface and using that digital terrain surface to compute the received signal at some other point located on that surface by calculating signal level loss.

The problem that arises is once the received signal level is calculated, the S/N ratio must be determined since it is used directly or, in the case of digital communications, it is used to find the digital link bit error rate (BER) from the known input S/N versus bit error rate relationship characteristic of the radio being portrayed by the model. Some models make guesses at the RF noise floor (to use for the value of N in the S/N ratio) based on various reference sources. In some cases these guesses are fairly soundly based, and other times just based on the user's intuition, which results in inaccurate estimates. For example, these guesses are based on curves of the external noise in the frequency range of 2 MHz to 2 GHz as given in the ITT Reference Data for Radio Engineers Handbook currently published by Howard Sams and Company (1968), the complete disclosure of which is herein incorporated by reference. These curves give the external contribution to the total noise at a radio receiver using an isotropic antenna on the surface of the earth with a receiver bandwidth of 1 MHz, operating in what are called an Urban, Suburban, and Galactic (being called herein "Rural") environments.

A method for predicting the effect of a sweep jamming signal on a targeted radio receiver by calculating the jamming signal's effect on the average link Bit Error Rate (BER) of the receiver is described in U.S. Pat. No. 5,313,209 issued to Michaels, Jr. et al., the complete disclosure of which is herein incorporated by reference (hereinafter referred to as "the '209 patent"). The '209 patent describes how input parameters are utilized to determine the jamming signal's effect on a target receiver's peak Bit Error Rate, background bit error rate, and average link bit error rate. The average bit error rate indicates the jamming signal's overall effect on the targeted radio communications link. Moreover, the '209 patent describes how to determine whether the receiver perceives the jammer signal as a sweep jammer, a barrage jammer, or approximately a barrage jammer.

A jamming device transmits an electromagnetic RF jammer signal in the form of a broad band barrage jamming signal or a sweep jammer signal into a predetermined frequency spectral range in which its targeted radio links operate. When the jammer signal is of the form of broadband barrage noise, the effect on the receiver is readily calculable. However, when the radiated jammer signal is in the form of an instantaneous jammer signal of a given bandwidth swept across the targeted frequency spectrum, the affect on the targeted receivers is much more difficult to predict. To this end, the '209 patent describes a valuable process to predict the affects on the targeted receivers. The effects of such a sweep jammer signal on a receiver depend on the electrical and physical characteristics of both the targeted receiver and the transmitted jamming signal. The various possible parameters produce a wide variety of possible affects on the targeted radio's communications ranging from no effect at all to a total blockage of digital radio communications.

The main concern of both the radio operator and the jamming device operator is the effect the sweep jamming signal will have on the average link Bit Error Rate of the targeted radio link. Again, the '209 patent describes how to accurately predict the extent to which the link BER will be increased when the radio receivers are exposed to a sweep jammer signal. Such information is crucial for determining whether a given jamming device can successfully block digital radio communications (as in a combat environment).

Currently, the U.S. Army uses a model called the Terrain-Integrated Rough-Earth Model (TIREM) to calculate a mean RF propagation loss value given a terrain profile along the RF link path. A method for optimizing an RF communications network for use in a battlefield environment is described in U.S. Pat. No. 6,232,909 issued to Masciulli, the complete disclosure of which is herein incorporated by reference (hereinafter referred to as "the '909 patent"). The '909 patent describes a process for determining the performance of radio frequency links in the United States Army's Enhanced Position Reporting System (EPLRS) with a high level of statistical confidence. The method described therein includes determining a statistical difference between a mean propagation loss for an EPLRS RF link based on measured RF propagation loss and Terrain-Integrated Rough-Earth Model (TIREM) calculated RF propagation loss, establishing a margin of error based on the statistical difference to arrive at a confidence level of the RF propagation loss, determining a computed signal to noise ratio (S/N) based on the confidence level, for the benign and jamming case, and determining a Probability of Communication (PCOM) value based on the computed S/N value.

EPLRS is an integrated communications system that provides near real-time data communications, such as global positioning communications including position/location, navigation, identification, and reporting information on the modern battlefield. The system, which may include 300-1500 terminals in a division with up to five Network Control Stations (NCS), utilizes spread spectrum technology and frequency hopping error detection and correction and is capable of supporting multiple communication channel operations. Understanding RF link performance is critical to the effective use of EPLRS. RF link performance is broadly characterized by the ratio of desired EPLRS received signals to noise within the communication channel (the S/N ratio).

The above methods describe how the received signal level (S) can be calculated (for example using TIREM). However, the noise value (N) is sometimes more difficult to determine. Therefore, while the above-referenced U.S. patents disclose embodiments that were satisfactory for the purposes for which they were intended, there remains a need for a system and method of determining where the ambient noise estimate is generated from and how it affects estimating the expected performance of radio frequency radio links.

SUMMARY OF INVENTION

In view of the foregoing, an embodiment of the invention provides a method of estimating radio frequency background noise in a radio receiver system, and a computer program embodying the method, wherein the method comprises (a) determining a total receiver front-end noise based on a noise equivalent receiver bandwidth; (b) estimating external noise associated with the radio receiver system; (c) determining internal noise associated with the radio receiver system from a known noise value; (d) combining the external noise with the internal noise; (e) determining an absolute external radio frequency background noise floor associated with the radio receiver system; (f) estimating an out of band noise contribution based on radio receiver selectivity and known received noise levels of out of band sources; and (g) generating a radio frequency noise estimate in the radio receiver system based on the steps (a) through (f).

The method further comprises utilizing the radio frequency noise estimate to form a radio frequency receiver signal to noise ratio, wherein the radio frequency receiver signal to noise ratio enables an estimate performance of radio frequency radio links in the radio receiver system operating in any of a benign and hostile radio frequency environment. Moreover, the method further comprises identifying a range of reasonableness of the signal to noise ratio; utilizing the selectivity characteristic value of the radio receiver system; utilizing known input noise values of radio frequency sources; and combining the selectivity characteristic value and the known input noise values to generate the radio frequency noise estimate in the radio receiver system. Additionally, the method comprises identifying a type of radio system characteristic of the radio frequency noise estimate; utilizing a noise temperature value associated with an amplifier in the radio receiver system; and utilizing an antenna and cable loss value in the radio receiver system; wherein the noise temperature value and the antenna and cable loss value are used to generate the radio frequency noise estimate.

In another embodiment, the invention provides a computing system for estimating radio frequency background noise in a radio receiver system comprising (a) means for determining a total receiver front-end noise based on a noise equivalent receiver bandwidth; (b) means for estimating external noise associated with the radio receiver system; (c) means for determining internal noise associated with the radio receiver system from a known noise value; (d) means for combining the external noise with the internal noise; (e) means for determining an absolute external radio frequency background noise floor associated with the radio receiver system; (f) means for estimating an out of band noise contribution based on radio receiver selectivity and known received noise levels of out of band sources; and (g) means for generating a radio frequency noise estimate in the radio receiver system based on (a) through (f).

Furthermore, the computing system comprises means for utilizing the radio frequency noise estimate to form a radio frequency receiver signal to noise ratio, wherein the radio frequency receiver signal to noise ratio enables an estimate performance of radio frequency radio links in the radio receiver system operating in any of a benign and hostile radio frequency environment.

Additionally, the computing system further comprises means for identifying a range of reasonableness of the signal to noise ratio; means for utilizing a selectivity characteristic value of the radio receiver system; means for utilizing known input noise values of radio frequency sources; means for combining the selectivity characteristic value and the known input noise values to generate the radio frequency noise estimate in the radio receiver system; means for identifying a type of radio system characteristic of the radio frequency noise estimate; means for utilizing a noise temperature value associated with an amplifier in the radio receiver system; and means for utilizing an antenna and cable loss value in the radio receiver system, wherein the noise temperature value and the antenna and cable loss value are used to generate the radio frequency noise estimate.

The invention has several advantages. The invention provides a coherent and reasonable method of estimating the RF noise environment for any given radio receiver. Moreover, experimental tests have studied the validity of the invention's method, and have found that the resulting values of the RF noise determined by the invention have been accurately and, in some cases; exactly predicted. For example, the RF noise estimation process provided by the invention may be applied to GPS systems to predict the maximum receiver S/N. In fact, experimental testing in this environment has been successful, as the estimate of N was determined to be correct.

These, and other aspects and advantages of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

The invention will be better understood from the following detailed description of the preferred embodiments of the invention with reference to the drawings, in which:

FIG. 1(b) is a flow diagram illustrating an embodiment of a preferred method of the invention;

FIG. 1(c) is a flow diagram illustrating an embodiment of a preferred method of the invention;

FIG. 1(d) is a flow diagram illustrating an embodiment of a preferred method of the invention;

DETAILED DESCRIPTION OF PREFERRED EMBODIMENTS OF THE INVENTION

Figure 1A:
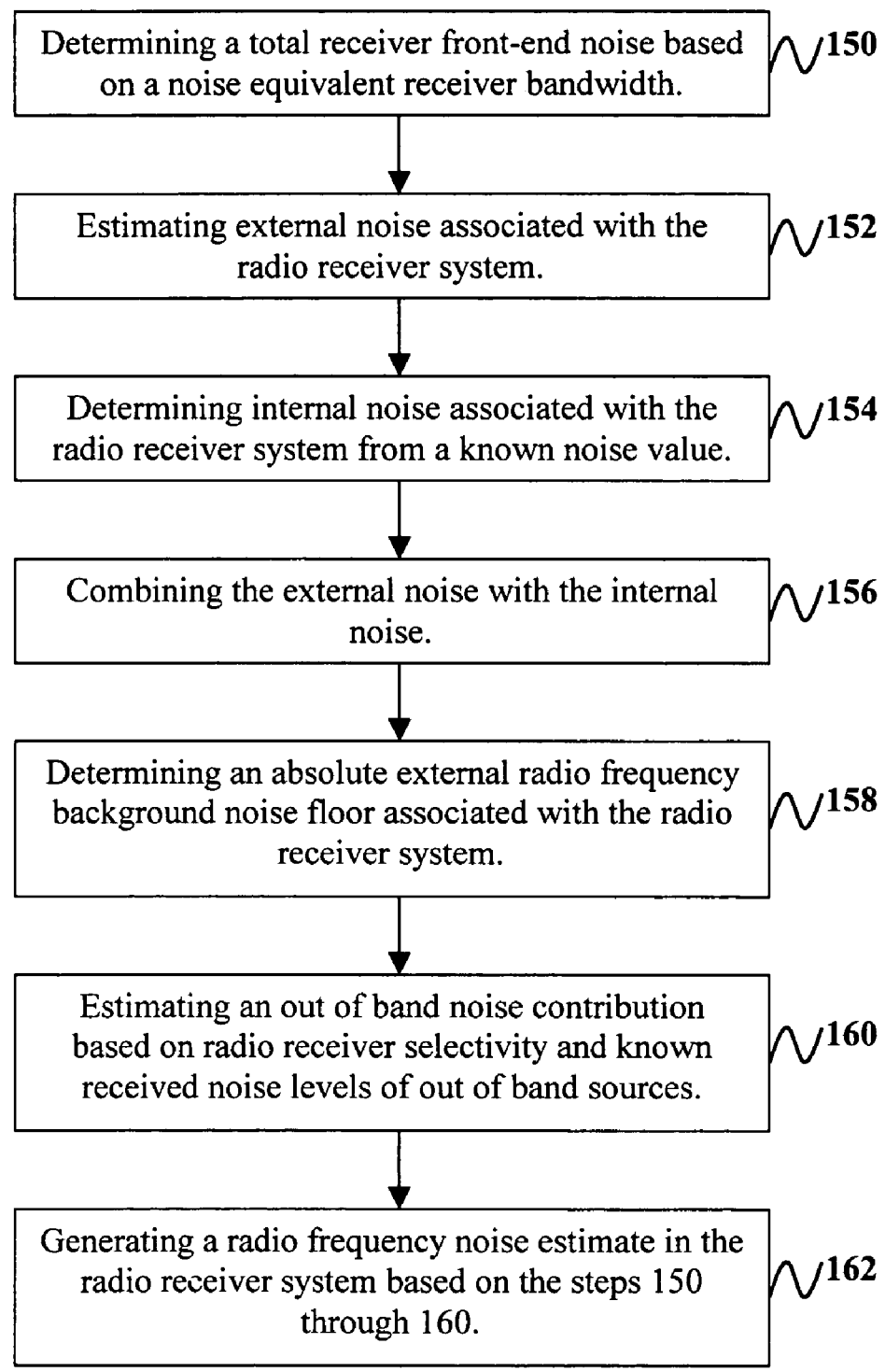
FIG. 1(a) is a flow diagram illustrating an embodiment of a preferred method of the invention.

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for a system and method of determining where the ambient noise estimate is generated from and how it affects estimating the expected performance of radio frequency radio links. Referring now to the drawings, and more particularly to FIGS. 1 through 5(q), there are shown preferred embodiments of the invention.

FIG. 1(a) is a flow diagram illustrating a preferred method of the invention, wherein a method of estimating radio frequency background noise in a radio receiver system comprises determining 150 a total receiver front-end noise based on a noise equivalent receiver bandwidth; estimating 152 external noise associated with the radio receiver system; determining 154 internal noise associated with the radio receiver system from a known noise value; combining 156 the external noise with the internal noise; determining 158 an absolute external radio frequency background noise floor associated with the radio receiver system; estimating 160 an out of band noise contribution based on radio receiver selectivity and known received noise levels of out of band sources; and generating 162 a radio frequency noise estimate in the radio receiver system based on the steps 150 through 160.

As shown in the flow diagram of FIG. 1(b), the method further comprises utilizing 164 the radio frequency noise estimate to form a radio frequency receiver signal to noise ratio, wherein the radio frequency receiver signal to noise ratio enables an estimate performance of radio frequency radio links in the radio receiver system operating in any of a benign and hostile radio frequency environment. Moreover, the method further comprises identifying 166 a range of reasonabless of the signal to noise ratio. The range of reasonabless comprises a range of ±10% of a measured comparison signal to noise ratio value. The method also comprises utilizing 170 the selectivity characteristics (value) of the radio receiver system; determining 172 known input noise values of radio frequency noise sources; and combining 174 the selectivity characteristic value and the known input noise values to generate the radio frequency noise estimate in the radio receiver system, as depicted in the flow diagram of FIG. 1(c). Additionally, as shown in the flow diagram of FIG. 1(d), the method further comprises identifying 180 a type of radio system characteristic of the radio frequency noise estimate; utilizing 182 a noise temperature value associated with an amplifier in the radio receiver system; and utilizing 184 an antenna and cable loss value in the radio receiver system; wherein the noise temperature value and the antenna and cable loss value are used to generate the radio frequency noise estimate.

The invention solves the above-identified problem of estimating the expected performance of RF radio links operating in a benign and hostile RF environment where the receiver S/N ratio needs to be determined. As previously mentioned, the received signal level (S) can be calculated by conventional techniques such as the use of TIREM, but the noise value (N) is sometimes more than the receivers front-end noise, and as such, in the past, has been difficult to accurately determine. As such, the invention provides a starting estimate of the environmental RF noise environment for any given radio receiver operating in a laboratory setting or, more importantly, for real world applications, including military application.

According to the invention, in the process of analyzing the expected performance of radio links, including utilizing modeling and simulation, a method of estimating the real world RF noise environment has been achieved. A process, embodied in computer program software code, which makes this estimation, is also provided by the invention.

According to the invention, the RF background noise into a receiver comprises two components. One of these components is the internal noise of the receiver, which is found by adding the receiver noise figure to the thermal noise of the receiver. The thermal noise of the receiver is found by calculating the quantity (k×B×T), where k is Boltzman's constant, B is the "noise equivalent" bandwidth of the receiver expressed in Hertz, and T is the receiver temperature of the receiver expressed in Kelvin. The total RF background noise of the receiver is then equal to its noise value added to kBT plus the external noise coming down the antenna.

The curves given in the ITT Handbook gives the external noise as if it were an additive quantity to be added to the noise value to find the total RF background noise. That is, the external noise given in the references is given in units of dB with respect to a 1 MHz bandwidth receiver. This external component therefore must be corrected for receiver bandwidth when it is added to the internal noise to take into account the receiver. The invention uses these calculations for estimating the RF background noise based on the receiver frequency (in MHz), receiver bandwidth (in MHz), receiver temperature (in degrees Fahrenheit), total antenna cable loss, and selected environmental factors as well as incorporating a contribution to the received noise arising because of the receiver selectivity. The cable loss is considered here to diminish the RF noise to be added because it attenuates the external component.

As mentioned, the invention comprises two main components. The first component is the RF noise estimation alone. This is performed by, first, finding the total receiver front-end noise emanating from the noise equivalent receiver bandwidth and the characteristic radio noise figure (value). The method according to the invention starts with default values for all the input variables for several existing U.S. Army radio systems such as, for example, EPLRS, SINCGARS, and MSE radios. The computer software implementation of the invention also has a default problem that is used to verify that the computer code is running correctly, and allows an option for writing all of the input and output results to an external ASCII file. Then, the external noise is estimated using a series of equations given in the standard ITT Handbook for rural, suburban, and urban noise environments, which is one of the input choices. However, these ITT textbook equations are merely an estimate and are not usable above certain VHF and UHF frequencies for which reason the absolute background noise is also calculated using the well-known Nobel Prize winning Penzias and Wilson methodology of determining the absolute RF background noise of the universe.

According to the invention, in this part of the method, whenever the ITT equations calculate an external noise value below the absolute value, the absolute value is automatically used. The invention then adds the internal and external noise to find the RF noise estimate also utilizing the input cable loss in the calculation along with the receiver noise temperature. Cable loss attenuates the contribution from the external environment only. Moreover, antennas may be connected to the radio receivers by long RF cables. Receiver noise temperatures are usually the temperature of the real world environment and are given in units Kelvin, and wherein it allows one to calculate NF+kBT, where NF is the noise floor.

In these circumstances whenever a receiver is dominated by its internal noise, the invention gives an exact calculation for the noise floor, and whenever the receiver is dominated by the absolute background the invention also gives and exact value for the noise floor, and whenever neither of these conditions are met, the invention gives at best an estimate only as good as the ITT equations which have a range of 14 dB from maximum to minimum. The invention is able to provide exact values for the noise floor in the following manner. When the invention indicates that the front-end noise dominates, it provides the NF+kBT values as the result, which is the exact value for the noise floor. When the external noise dominates, and only the absolute background can be seen, the invention provides this as the result, which is also an exact value. With regard to the absolute background, if the receiver noise equivalent bandwidth is very narrow, such as in the case of a GPS, then the NF+kBT value is much lower than the background value, thereby making the absolute background become "visible" or discernable, as proved by Penzias and Wilson. Furthermore, the receiver can be dominated by its internal noise because at high frequencies the external noise contribution is low, and if the bandwidth is large, then NF+kBT could be the major contribution, thus making the receiver "front-end noise limited."

The invention assumes the receiver has an omnidirectional antenna, and therefore its estimate for a high gain antenna is dependent on the gain of the antenna which is not incorporated (included). The problem is that a high gain antenna may be aimed at an unknown source and since the antenna has gain, the apparent signal seen at the receiver as being a type of "noise" or unwanted signal, appears stronger. Including (incorporating) it would require knowing where the antenna is aimed and the location of all the known sources and when the source may be passing through the field of view (i.e., such as a satellite). The invention also includes a contribution arising from the receiver's selectivity as its last component. This sub-process uses the selectivity of the receiver, channel-by-channel, and the known RF sources input noise, channel-by-channel, to find the total contribution to the RF noise by summing the contribution from all of the channels. Receivers typically have a characteristic that one channel away, a signal is seen some dB amount down (i.e., attenuated by that many dBs so that if there is a strong signal nearby transmitting close to the receiver frequency, it should not interfere if the signal is attenuated properly (enough)), two channels away, so many more dB down, three channels away some more dB down, etc. Some receivers do not have great selectivity characteristics, so that strong transmitters near the received frequency are "seen" even though they may not have emissions close to the receiver frequency.

Channel-by-channel refers to that portion of the invention that calculates the contribution by considering the receiver selectivity one channel away and the emitters at that frequency, then the next channel away and the emitters at that frequency, and then the next, and so forth. Typically, only fifty channels away on either side of the receiver frequency are needed. However, the invention incorporates a 200-channel limit. The invention uses the selectivity value if there are other transmitters operating at or close to the receiver frequency nearby. If there are no other such transmitters, then the selectivity value is zero; otherwise the invention incorporates this in determining its RF noise estimate. This output, from the selectivity sub-process, is then added to the internal and external noise if desired, to find the total noise estimate. Alternatively, the invention allows for skipping of the sub-process if desired. When a final output is generated, the invention informs the user which radio system his/her input parameters are most characteristic of, and cites the reference for the external noise estimate.

Table 1 shows experimental parameters derived using the invention for various types of radios. Then, Table 2 shows the values generated by the invention for the MSE I radio from Table 1. Next, Tables 3(a), 3(b), and 3(c) show the estimated noise values for the MSE I radio in a rural, suburban, and urban environment, respectively. For the sake of brevity, only the MSE I radio experimental values are illustrated.

TABLE 1

| | Radio Parameters | | | | |
| --- | --- | --- | --- | --- | --- |
| | MSE Band I | MSE Band III | RT 1539 | SINCGARS | EPLRS |
| Frequency (MHz) | 300 | 1500 | 45 | 59 | 440 |
| Receiver Bandwidth (MHz) | 0.3 | 0.6 | 0.03 | 0.02 | 3 |
| Receiver Noise (dB) | 6 | 8 | 8 | 9 | 8 |

TABLE 1-continued

Radio Parameters

|  | MSE Band I | MSE Band III | RT 1539 | SINCGARS | EPLRS |
|---|---|---|---|---|---|
| Antenna/Cable Losses (dBm) | 3 | 3 | 3 | 3 | 3 |
| Noise Temperature of Amplifier (° F.) | 62.5 | 62.5 | 62.5 | 62.5 | 62.5 |
| Selectivity Noise (Milliwatts) | 0 | 0 | 0 | 0 | 0 |

TABLE 2

MSE I Values

| Parameter | Value |
|---|---|
| Temperature (° F.) | 62.500000 |
| Temperature (° C.) | 16.944444 |
| Temperature (K) | 290.094444 |
| KBT - 1 mHz Noise | −113.974606 |
| Receiver Noise | 6.000000 |
| Receiver Bandwidth | 30.000000 |
| Received Frequency | 0.000000 |
| Bandwidth Correction Factor | 14.771213 |
| Antenna/Cable Losses | 3.000000 |

TABLE 3(a)

MSE I Results - Rural Environment

| | |
|---|---|
| Noise Factor (dBm) | 232.619130 |
| External Noise (dBm) | 130.415737 |
| Internal Noise (dBm) | −93.203393 |
| External Noise (Milliwatts) | 1.100458e+013 |
| Internal Noise (Milliwatts) | 4.782563e−010 |
| Selectivity Noise (Milliwatts) | 0.000000e+000 |
| Total Background Noise Floor (dBm) | 130.415737 |

TABLE 3(b)

MSE I Results - Suburban Environment

| | |
|---|---|
| Noise Factor (dBm) | 250.261780 |
| External Noise (dBm) | 148.058387 |
| Internal Noise (dBm) | −93.203393 |
| External Noise (Milliwatts) | 6.394972e+014 |
| Internal Noise (Milliwatts) | 4.782563e−010 |
| Selectivity Noise (Milliwatts) | 0.000000e+000 |
| Total Background Noise Floor (dBm) | 148.058387 |

TABLE 3(c)

MSE I Results - Urban Environment

| | |
|---|---|
| Noise Factor (dBm) | 270.908730 |
| External Noise (dBm) | 168.705337 |
| Internal Noise (dBm) | −93.203393 |
| External Noise (Milliwatts) | 7.422217e+016 |
| Internal Noise (Milliwatts) | 4.782563e−010 |
| Selectivity Noise (Milliwatts) | 0.000000e+000 |
| Total Background Noise Floor (dBm) | 168.705337 |

All of the starting input parameters used for the calculations are entered directly on the computer screen running the software and can be written to an output file. The computer code provided and used by the invention has embedded within it five different sets of parameters for five communication systems radios it is originally applied to, which are the MSE RT-1539 radio, the MSE Band-I radio (the GRC-226), the SINCGARS-V radio (the RT-1534), the EPLRS radio, and the MSE Band-III radio (also a GRC-226). To test the validity of the invention, the computer program implementing the methodology of the invention is run with the known MSE I radio values. The calculated RF background noise for this MSE I radio is then compared to known values of RF background noise for an MSE I radio, and the results are found to be very close (almost the exact same value), thus at least identifying the basis for the selection of those values for the RF background noise floor. Although no default parameters are included for HF radios, the invention can be used for making estimates at HF frequencies because the source curves are identified in the ITT Handbook as being good approximations down to 2 MHz.

The invention also provides a computing system for estimating radio frequency background noise in a radio receiver system comprising (a) means for determining a total receiver front-end noise based on a noise equivalent receiver bandwidth; (b) means for estimating external noise associated with the radio receiver system; (c) means for determining internal noise associated with the radio receiver system from a known noise value; (d) means for combining the external noise with the internal noise; (e) means for determining an absolute external radio frequency background noise floor associated with the radio receiver system; (f) means for estimating an out of band noise contribution based on radio receiver selectivity and known received noise levels of out of band sources; and (g) means for generating a radio frequency noise estimate in the radio receiver system based on (a) through (f).

Furthermore, the computing system comprises means for utilizing the radio frequency noise estimate to form a radio frequency receiver signal to noise ratio, wherein the radio frequency receiver signal to noise ratio enables an estimate performance of radio frequency radio links in the radio receiver system operating in any of a benign and hostile radio frequency environment. Additionally, the computing system further comprises means for identifying a range of reasonableness of the signal to noise ratio; means for utilizing the selectivity characteristic value(s) of the radio receiver system; means for utilizing known input noise values of radio frequency sources; means for combining the selectivity characteristic value(s) and the known input noise values to generate the radio frequency noise estimate in the radio receiver system; means for identifying a type of radio system characteristic of the radio frequency noise estimate; means for utilizing a noise temperature value associated with an amplifier in the radio receiver system; and means for utilizing an antenna and cable loss value in the radio receiver system, wherein the noise temperature value and the antenna and cable loss value are used to generate the radio frequency noise estimate.

Figure 2:
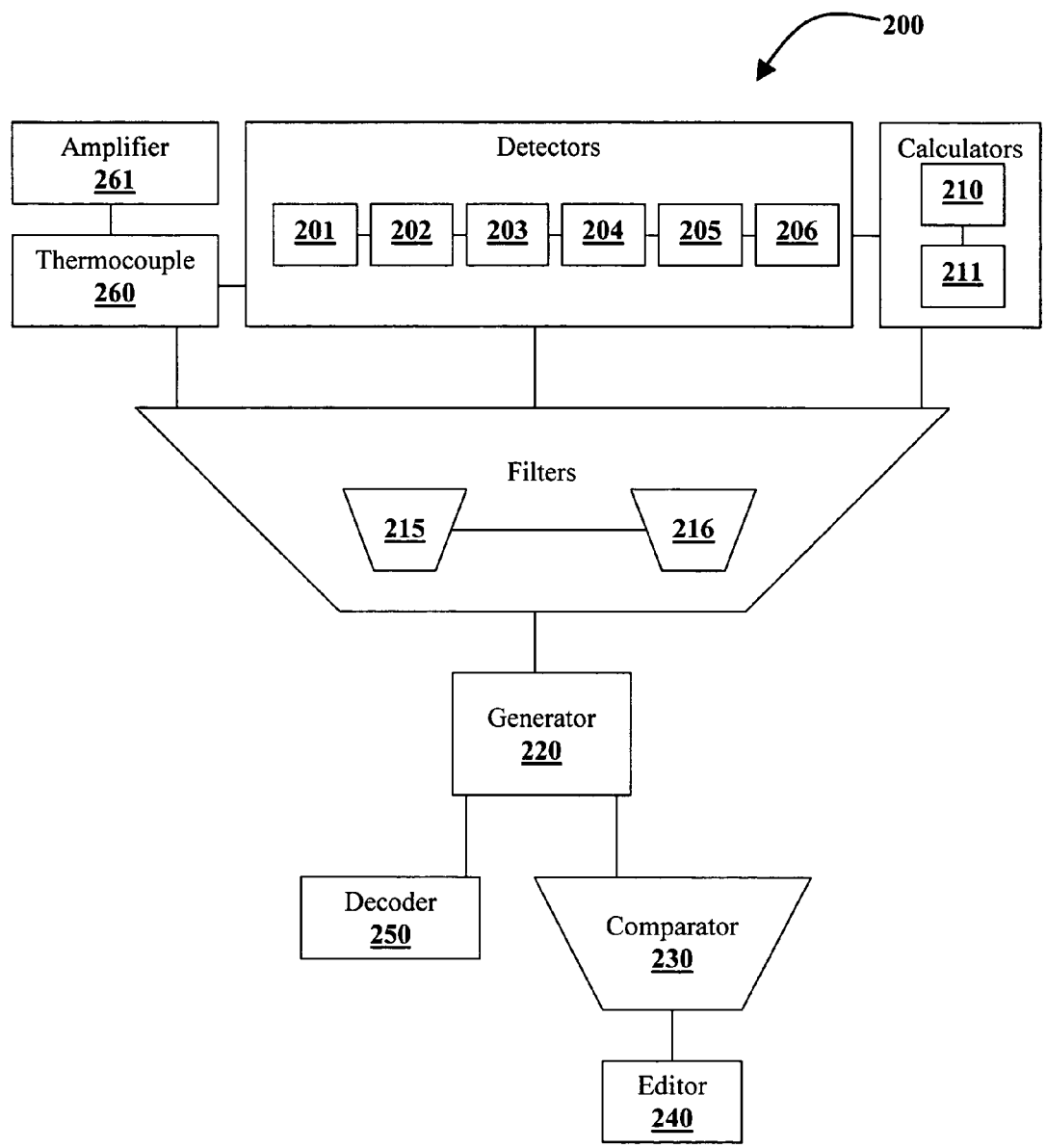
FIG. 2 is a system diagram according to an embodiment of the invention.

The computing system may incorporate computers, calculators, generators, transmitters, receivers, radios, comparators, detectors, decoders, and other data generation, consolidation, and calculation devices arranged to perform the functions described above. Furthermore, those skilled in the art will readily understand implementing such an arrangement to perform the functions described above. For example, a computing system 200 as illustrated in FIG. 2 may be used, comprising a first detector 201 operable for determining a total receiver front-end noise based on a noise equivalent receiver bandwidth; a first calculator 210 operable for estimating external noise associated with a radio receiver system 300 (illustrated in FIG. 3); a second detector 202 operable for determining internal noise associated with the radio receiver system from a known noise value; a first filter 215 operable for combining the external noise with the internal noise; a third detector 203 operable for determining an absolute external radio frequency background noise floor associated with the radio receiver system; a second calculator 211 operable for estimating an out of band noise contribution based on radio receiver selectivity and known received noise levels of out of band sources; and a generator 220 for generating a radio frequency noise estimate in the radio receiver system based on contributions from the first, second, and third detectors 201, 202, 203, the first and second calculators 210, 211, and the first filter 215.

Moreover, the computing system 200 may comprise a comparator 230 operable for utilizing the radio frequency noise estimate to form a radio frequency receiver signal to noise ratio, wherein the radio frequency receiver signal to noise ratio enables an estimate performance of radio frequency radio links in the radio receiver system operating in any of a benign and hostile radio frequency environment. Additionally, the computing system 200 further comprises an automated editor 240 operable for identifying a range of reasonableness of the signal to noise ratio; a fourth detector 204 operable for utilizing the selectivity characteristic value of the radio receiver system; a fifth detector 205 operable for utilizing known input noise values of radio frequency sources; a second filter 216 operable for combining the selectivity value and the known input noise values to generate the radio frequency noise estimate in the radio receiver system; a decoder 250 operable for identifying a type of radio system characteristic of the radio frequency noise estimate; a thermocouple 260 operable for utilizing a noise temperature value associated with an amplifier 261 in the radio receiver system; and a sixth detector 206 operable for utilizing an antenna and cable loss value in the radio receiver system, wherein the noise temperature value and the antenna and cable loss value are used to generate the radio frequency noise estimate.

Figure 3:
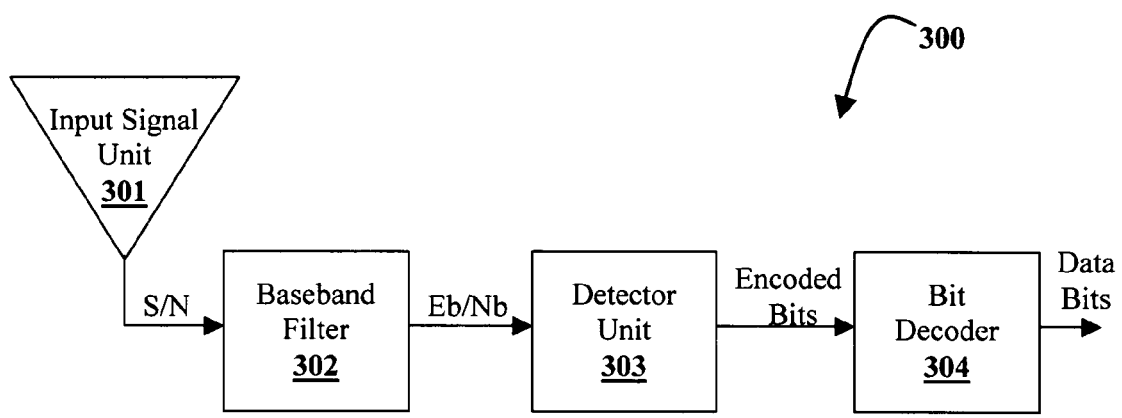
FIG. 3 is a system diagram according to an embodiment of the invention.

The radio receiver system 300 illustrated in FIG. 3 comprises an input signal unit 301, which sends an RF radio signal having a measurable S/N ratio into a baseband filter 302, which then generates an Eb/Nb ratio, where Eb is the energy per encoded bit of data, and Nb is the noise per encoded bit of data. A detector unit 303 receives this Eb/Nb ratio and generates encoded bits based upon it. The encoded bits are then sent to a bit decoder 304, which transforms them into data bits.

Figure 4:
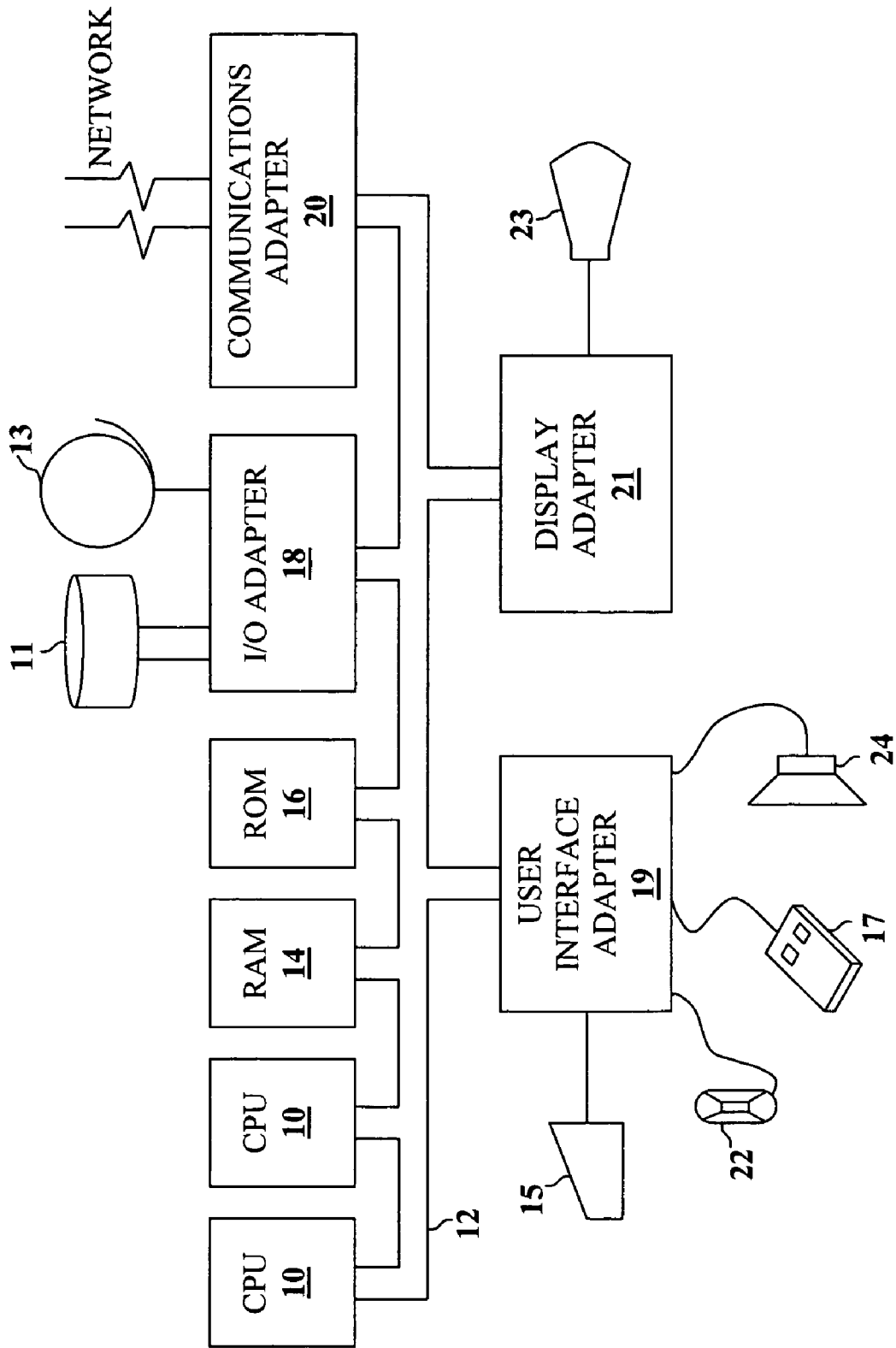
FIG. 4 is a system diagram according to an embodiment of the invention.
Figure 5A:
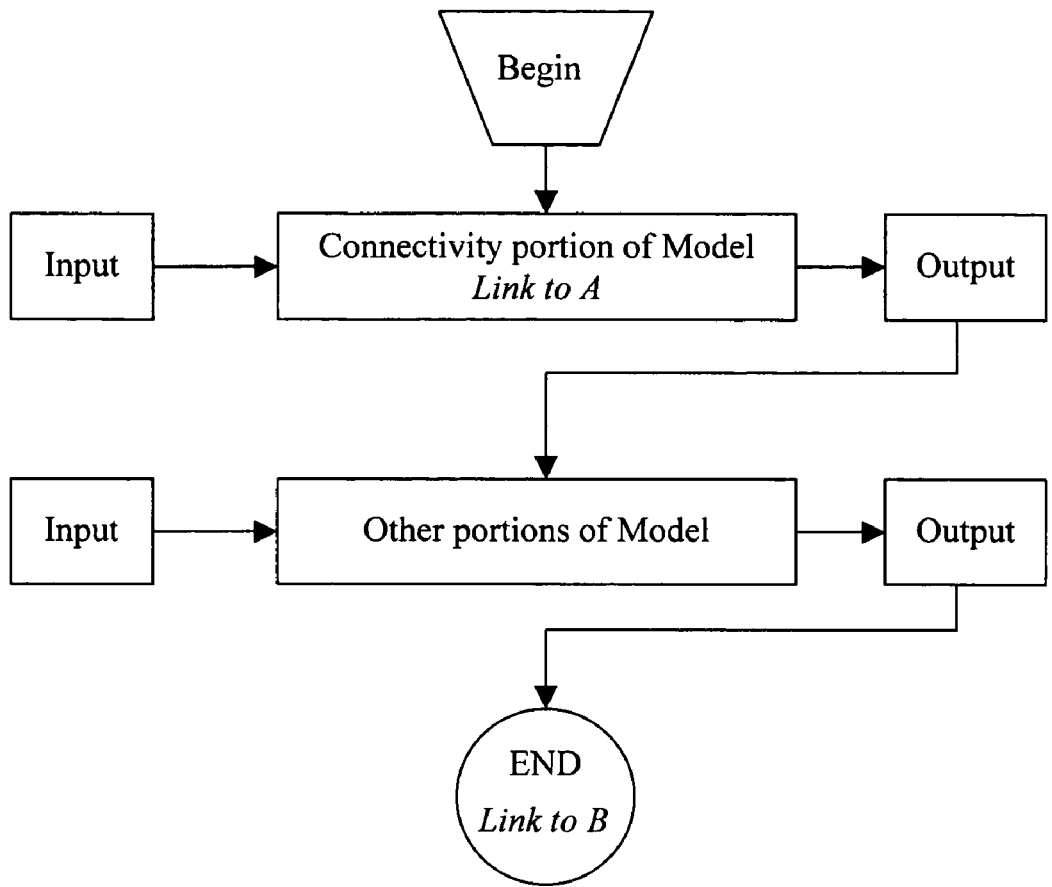
FIG. 5(a) is a program flowchart diagram illustrating a preferred method of implementing computer software code according to an embodiment of the invention.
Figure 5B:
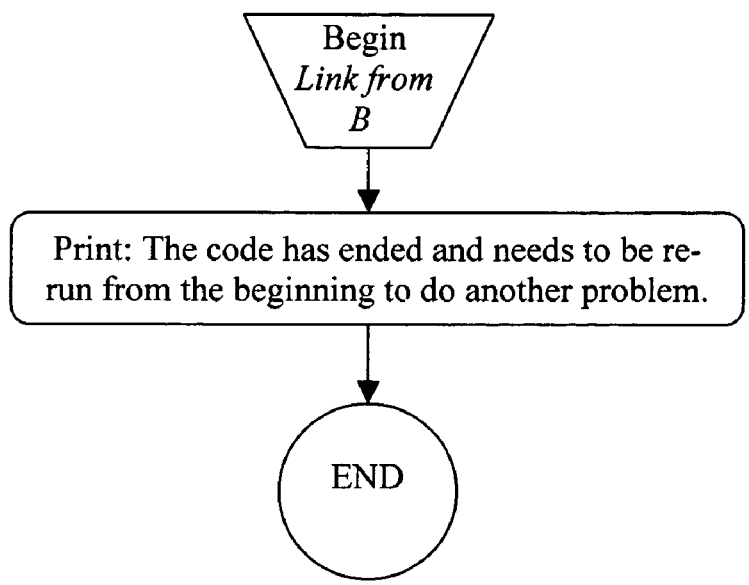
FIG. 5(b) is a program flowchart diagram illustrating a preferred method of implementing computer software code according to an embodiment of the invention.
Figure 5C:
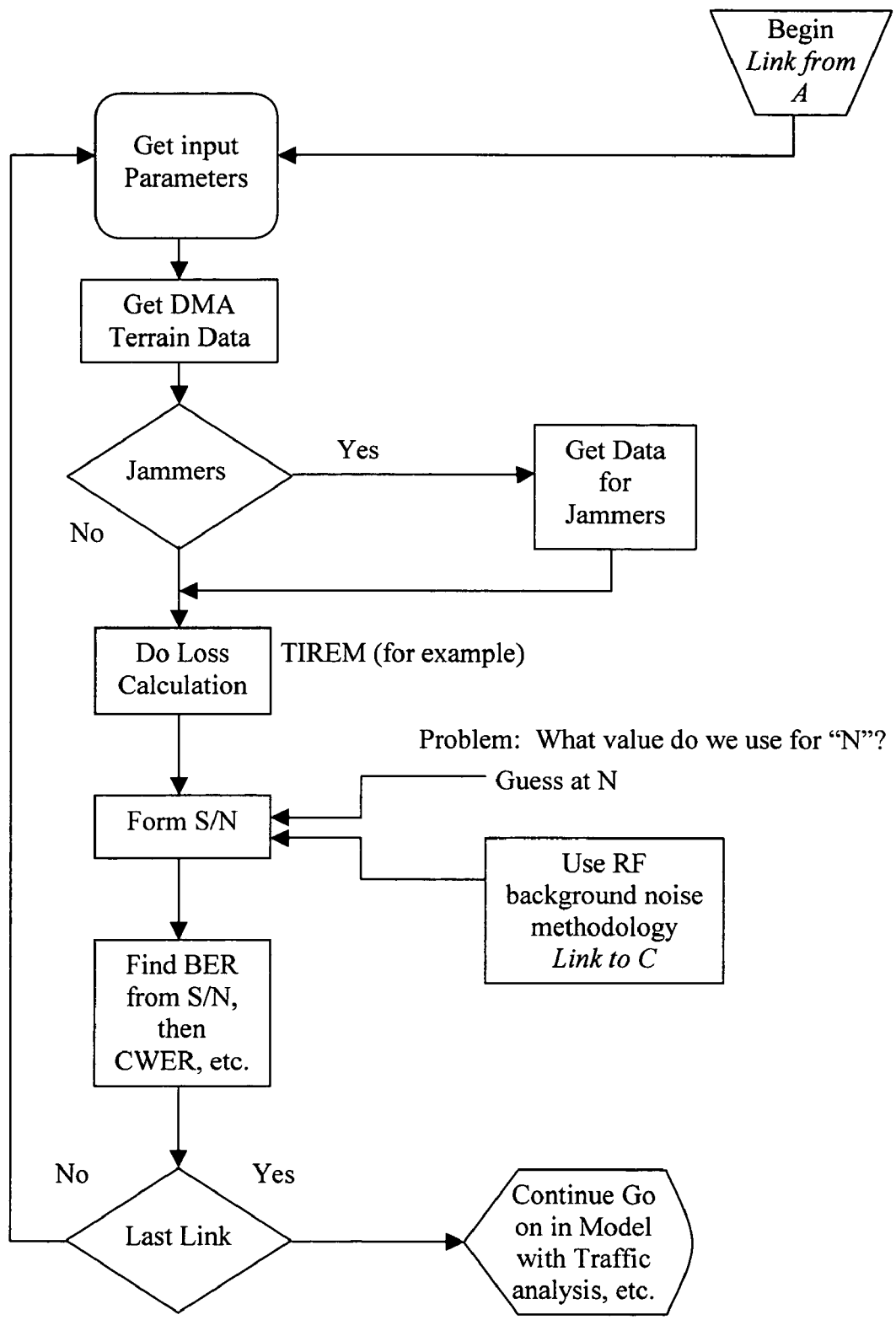
FIG. 5(c) is a program flowchart diagram illustrating a preferred method of implementing computer software code according to an embodiment of the invention.
Figure 5D:
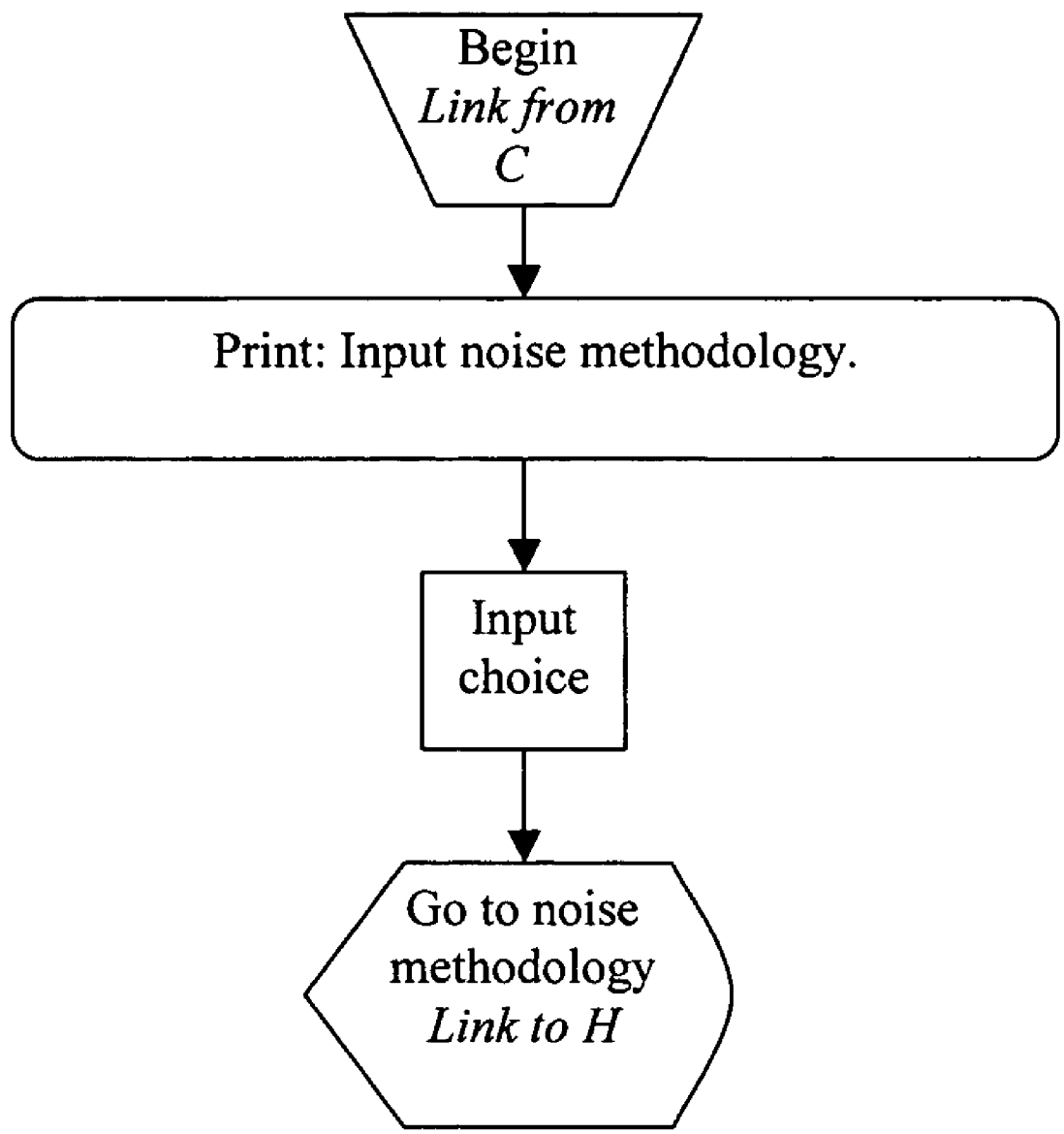
FIG. 5(d) is a program flowchart diagram illustrating a preferred method of implementing computer software code according to an embodiment of the invention.
Figure 5E:
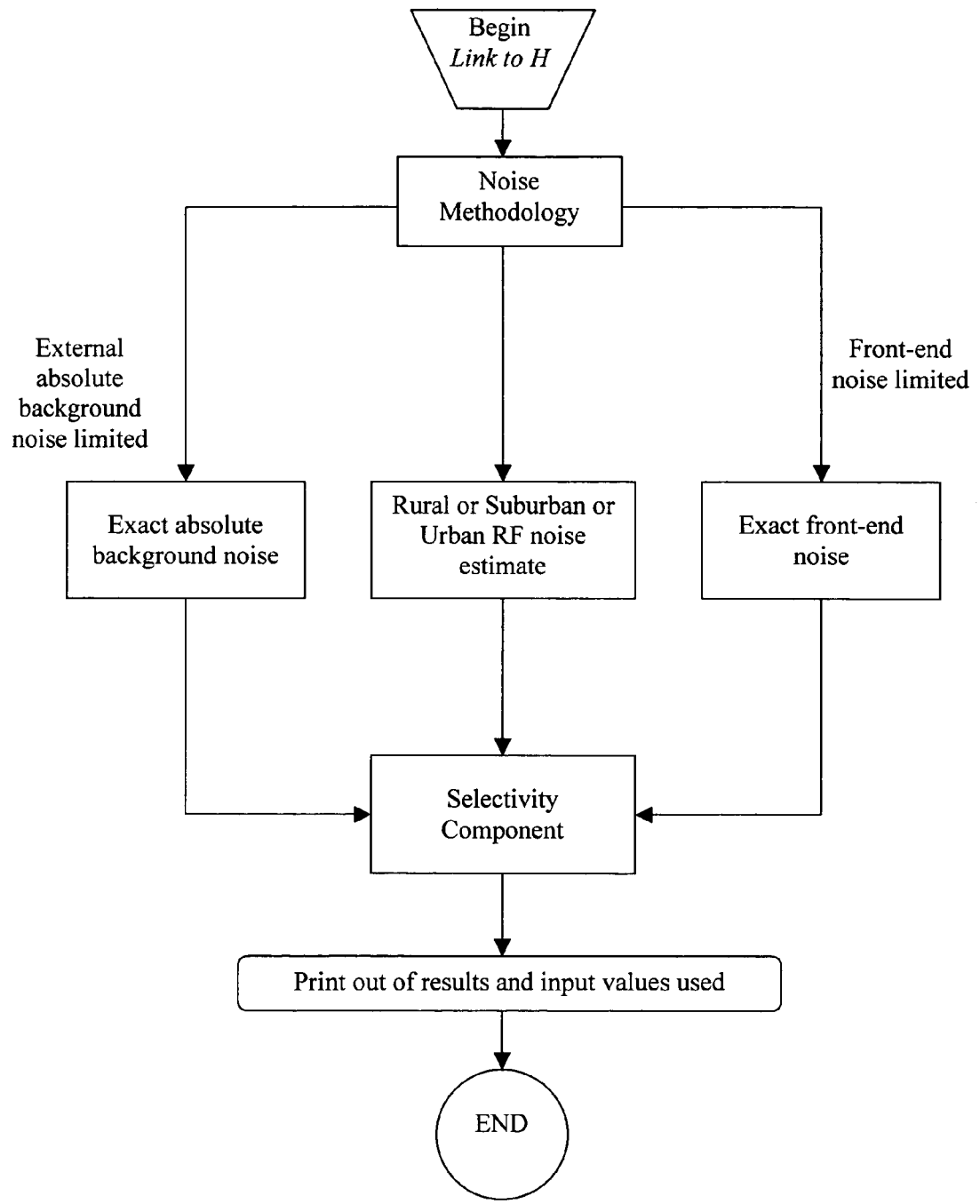
FIG. 5(e) is a program flowchart diagram illustrating a preferred method of implementing computer software code according to an embodiment of the invention.
Figure 5F:
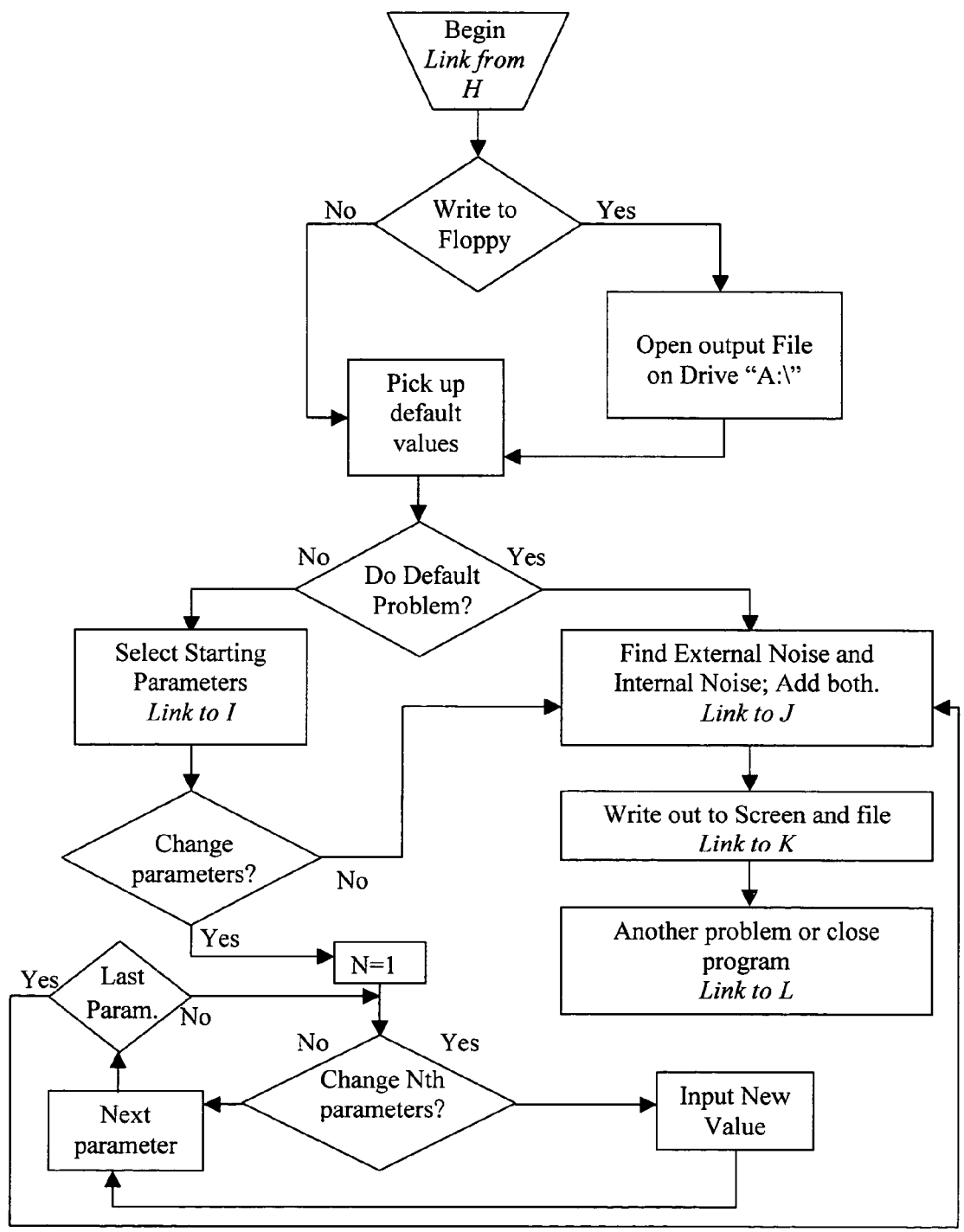
FIG. 5(f) is a program flowchart diagram illustrating a preferred method of implementing computer software code according to an embodiment of the invention.
Figure 5G:
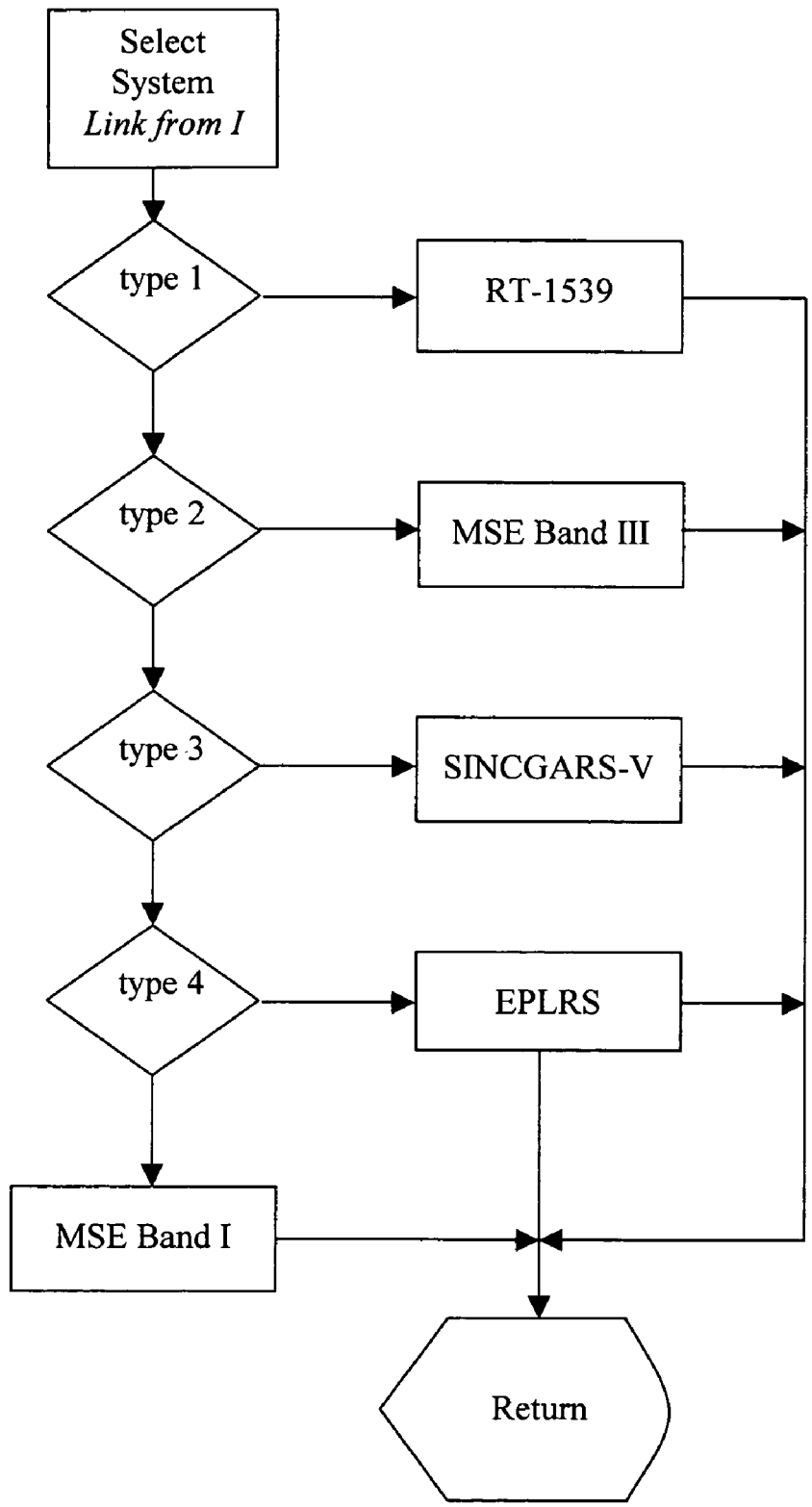
FIG. 5(g) is a program flowchart diagram illustrating a preferred method of implementing computer software code according to an embodiment of the invention.
Figure 5H:
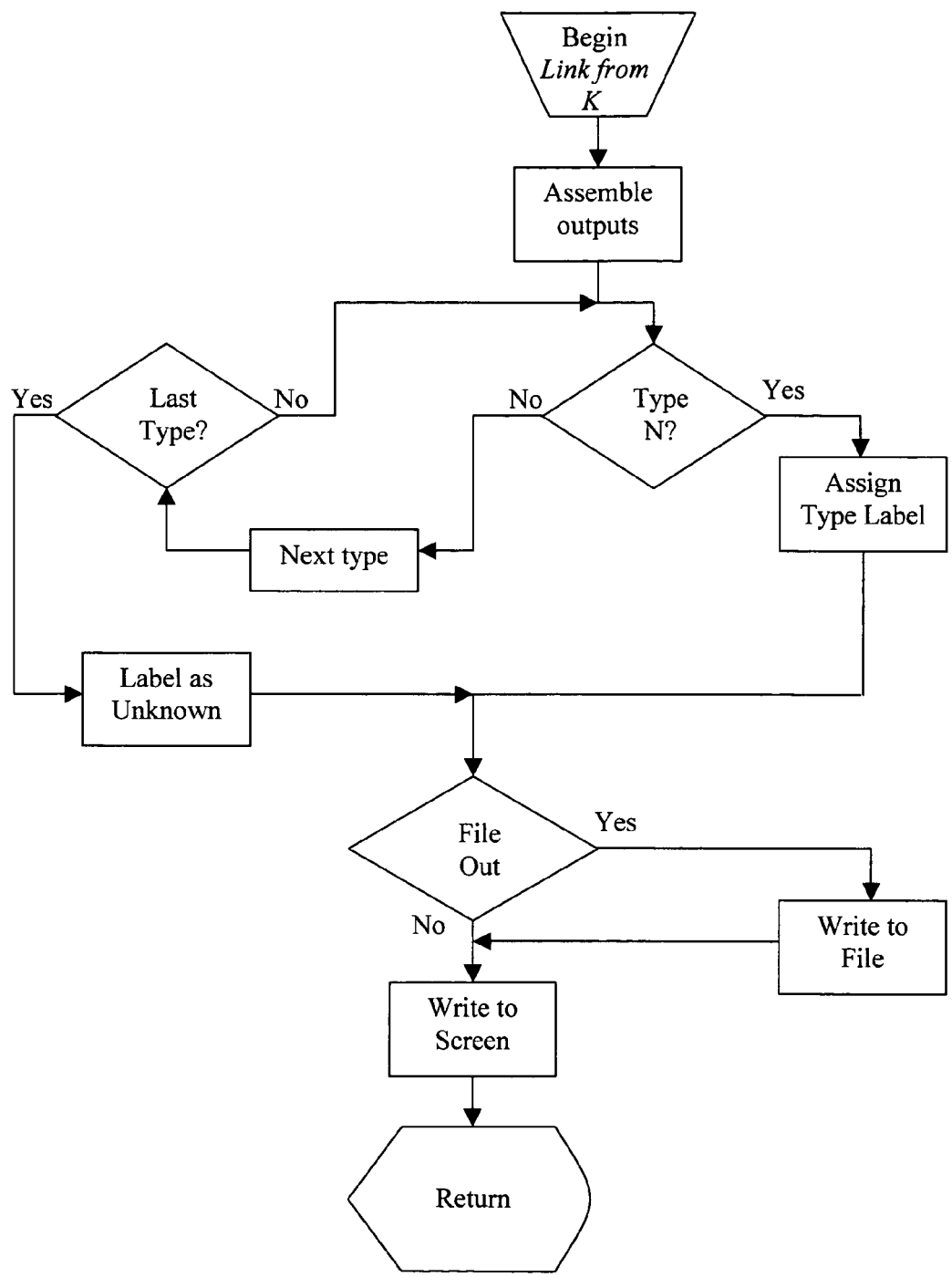
FIG. 5(h) is a program flowchart diagram illustrating a preferred method of implementing computer software code according to an embodiment of the invention.
Figure 5I:
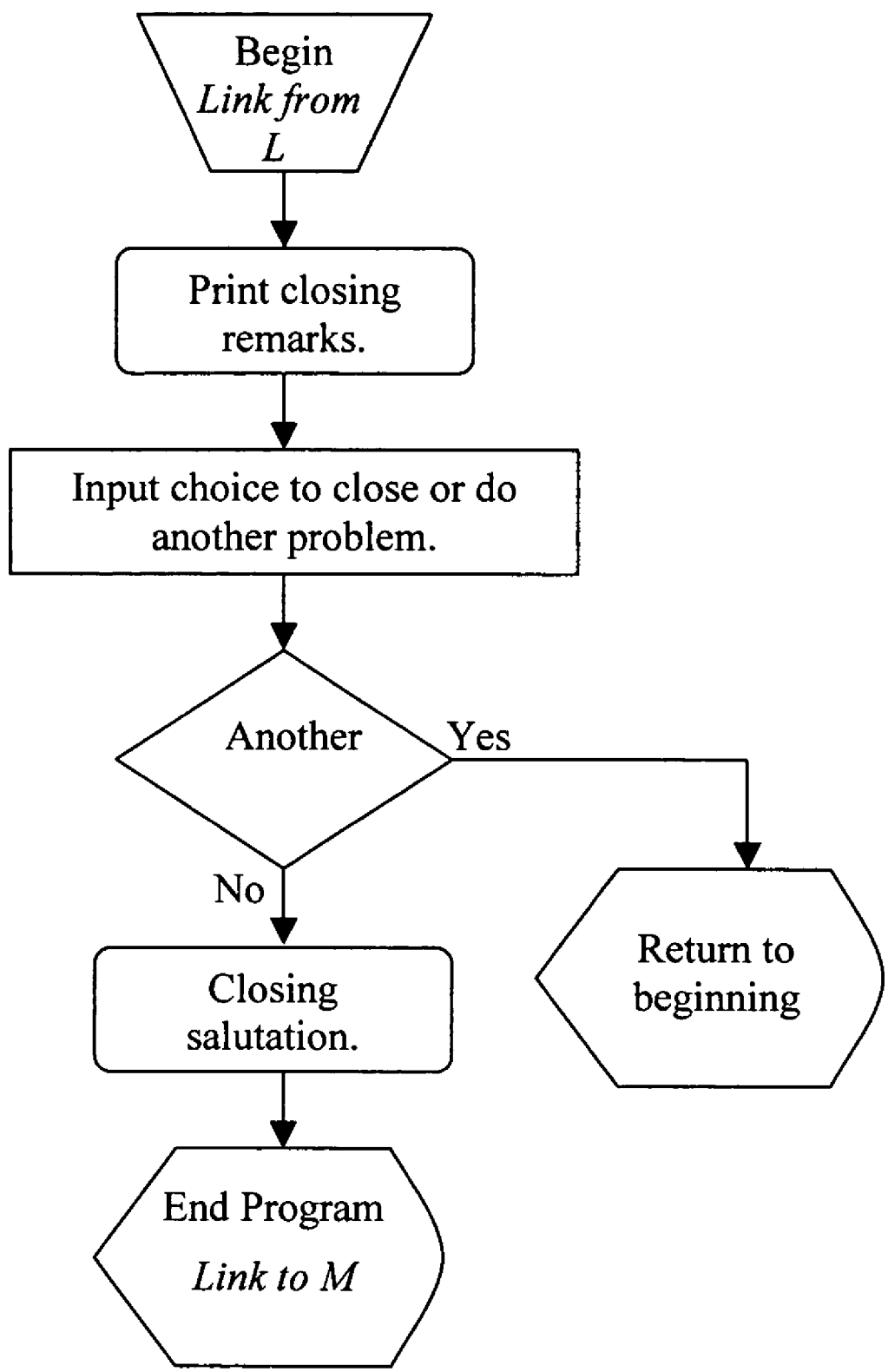
FIG. 5(i) is a program flowchart diagram illustrating a preferred method of implementing computer software code according to an embodiment of the invention.
Figure 5J:
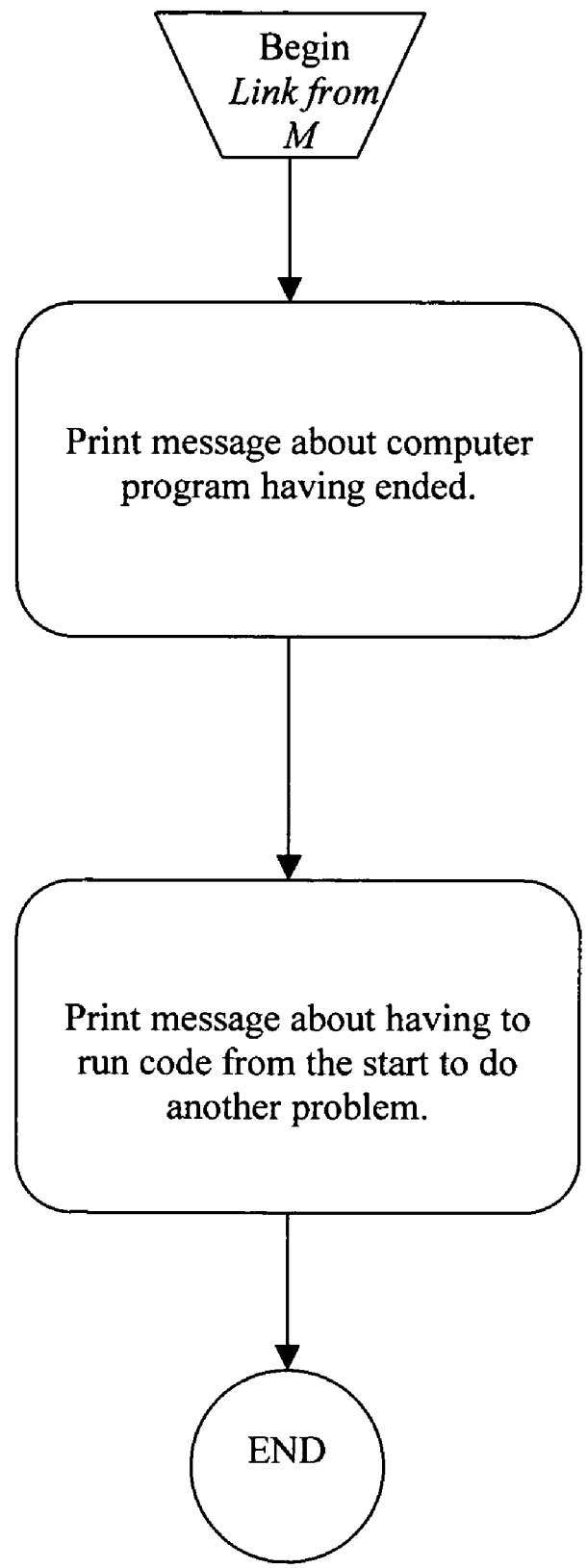
FIG. 5(j) is a program flowchart diagram illustrating a preferred method of implementing computer software code according to an embodiment of the invention.
Figure 5K:
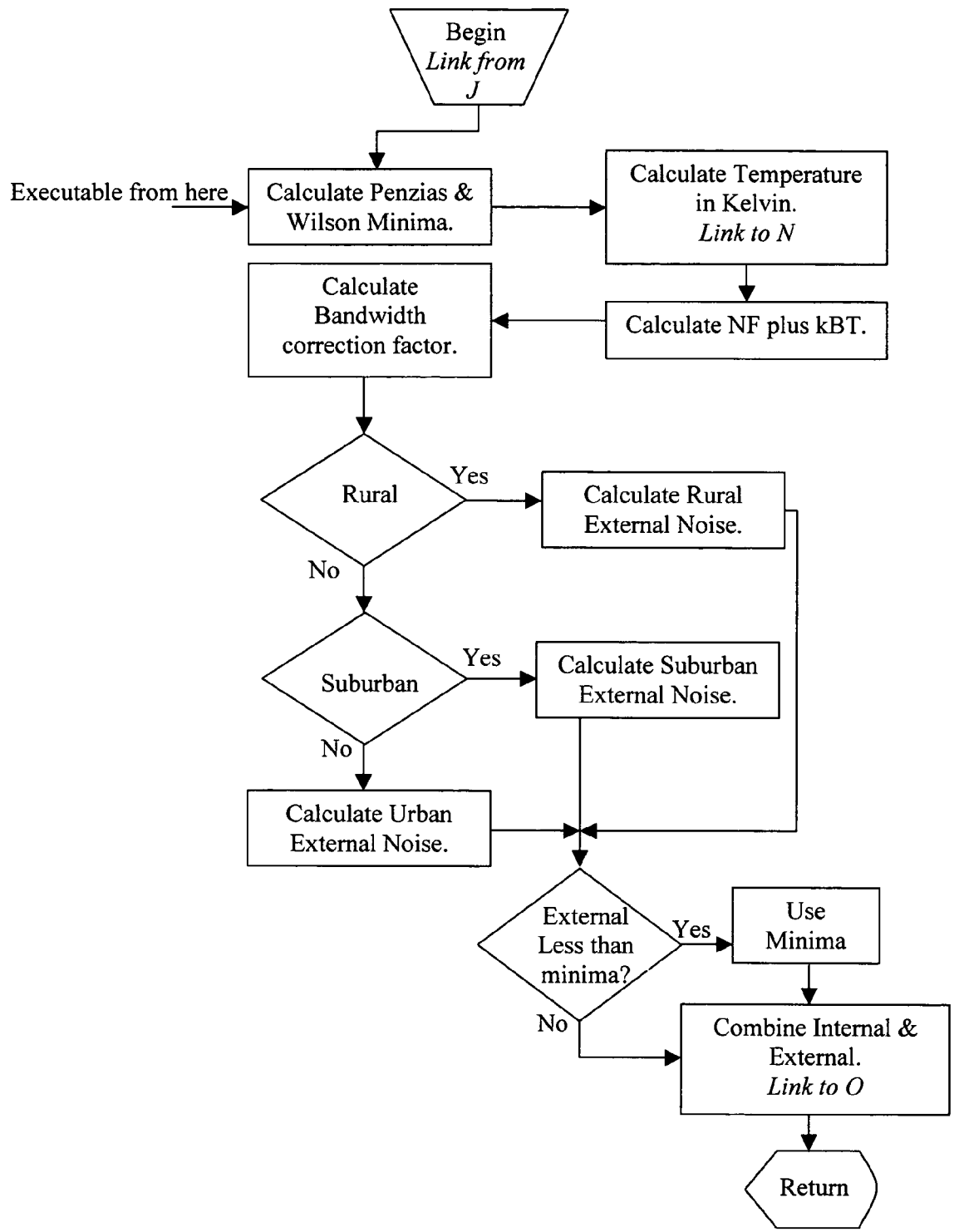
FIG. 5(k) is a program flowchart diagram illustrating a preferred method of implementing computer software code according to an embodiment of the invention.
Figure 5L:
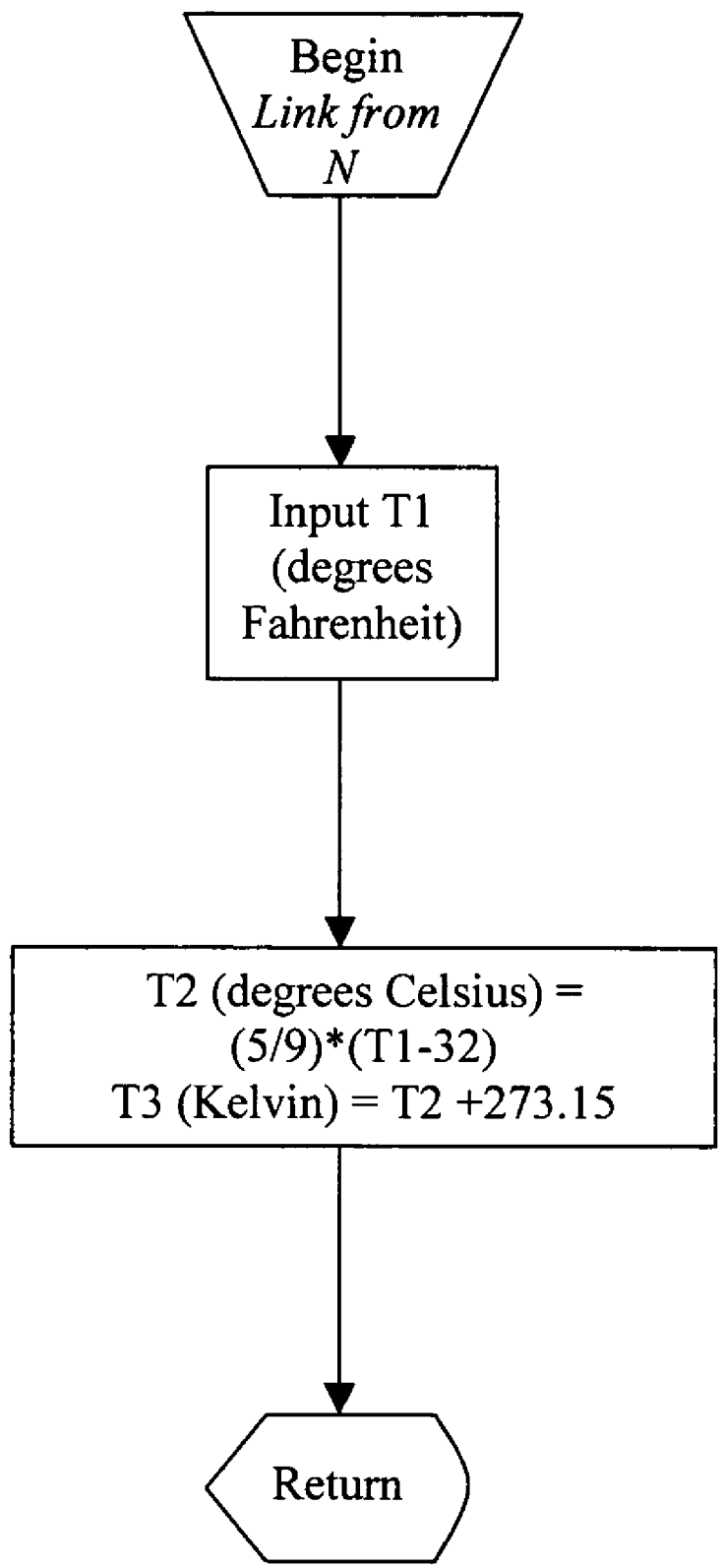
FIG. 5(l) is a program flowchart diagram illustrating a preferred method of implementing computer software code according to an embodiment of the invention.
Figure 5M:
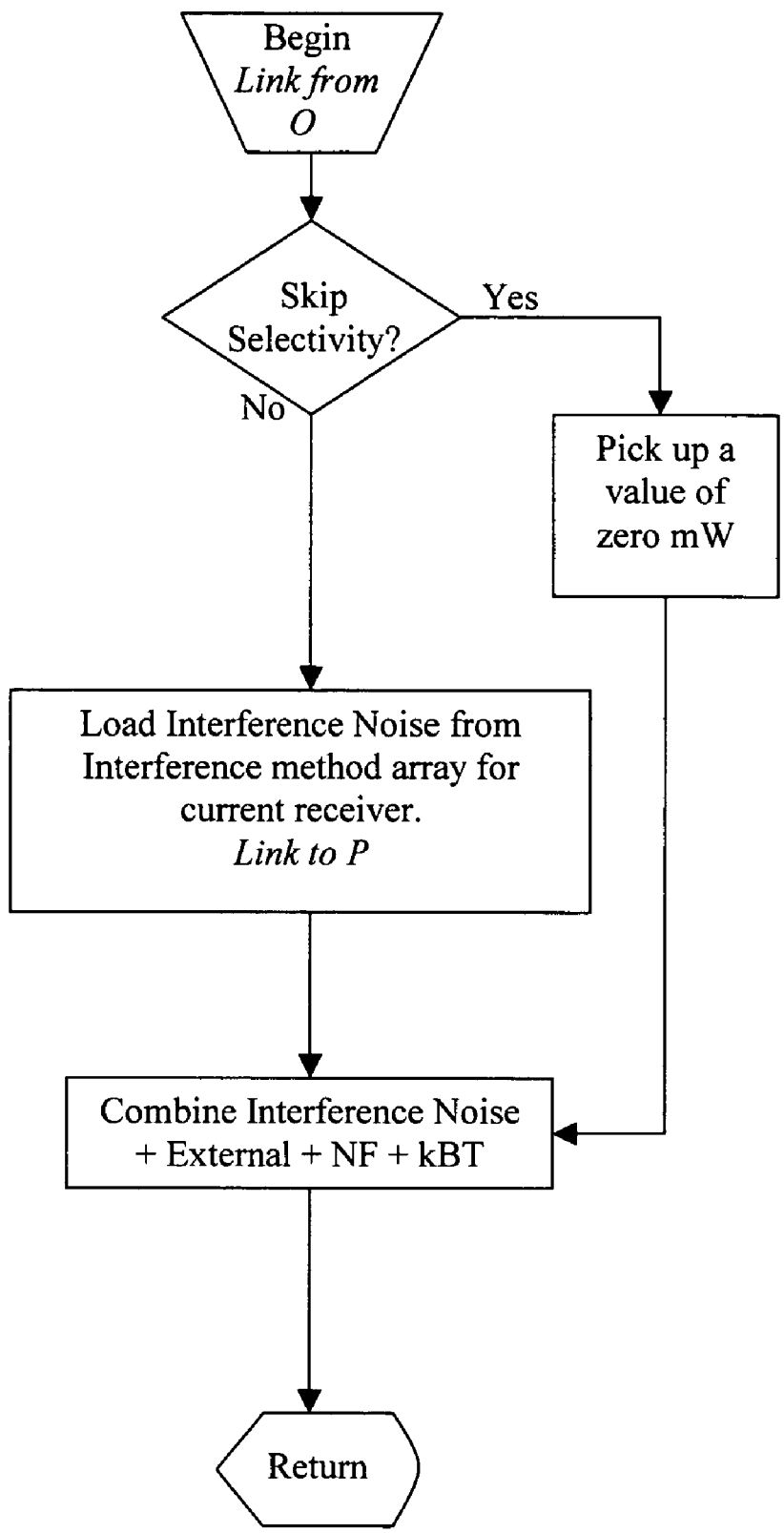
FIG. 5(m) is a program flowchart diagram illustrating a preferred method of implementing computer software code according to an embodiment of the invention.
Figure 5N:
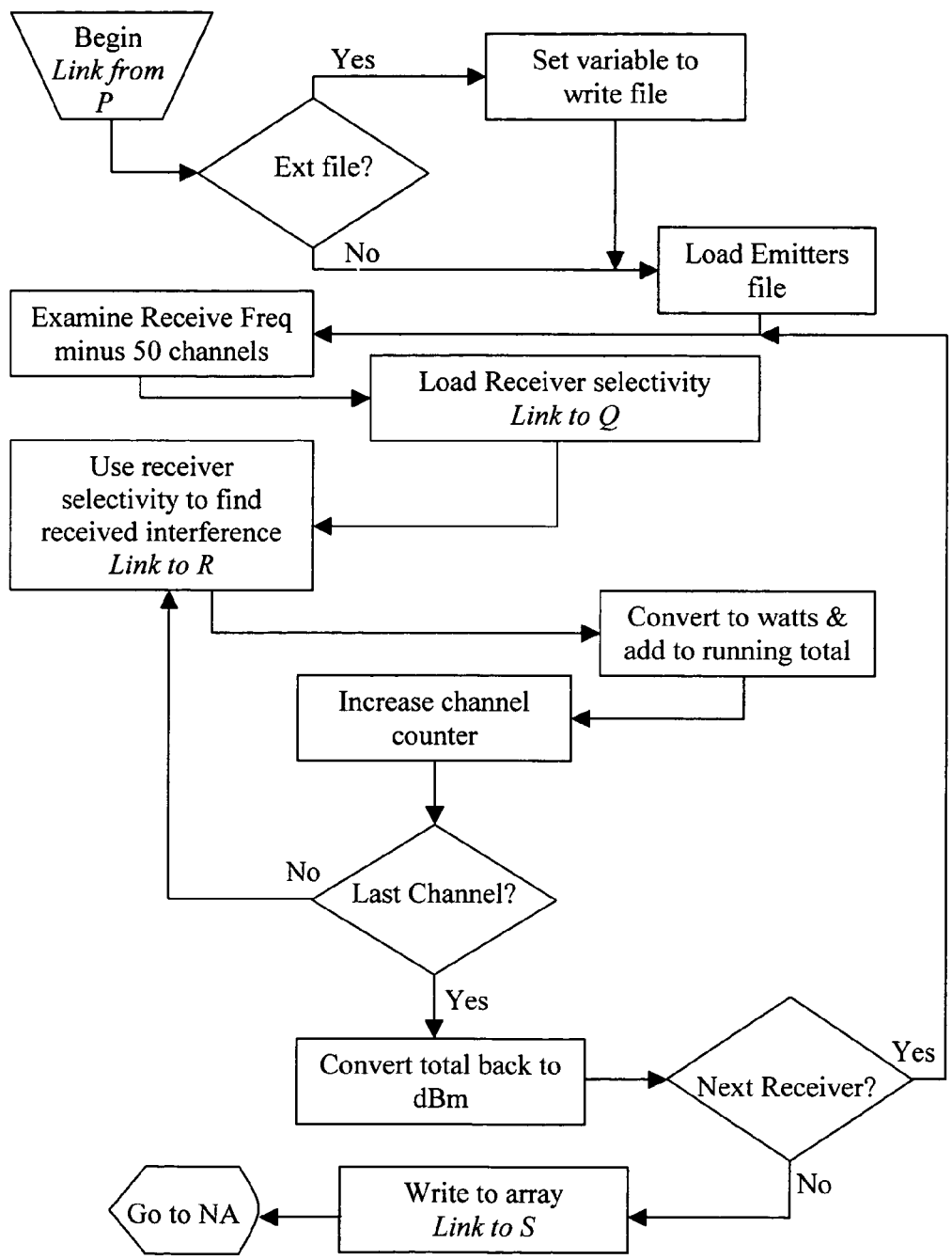
FIG. 5(n) is a program flowchart diagram illustrating a preferred method of implementing computer software code according to an embodiment of the invention.
Figure 5O:
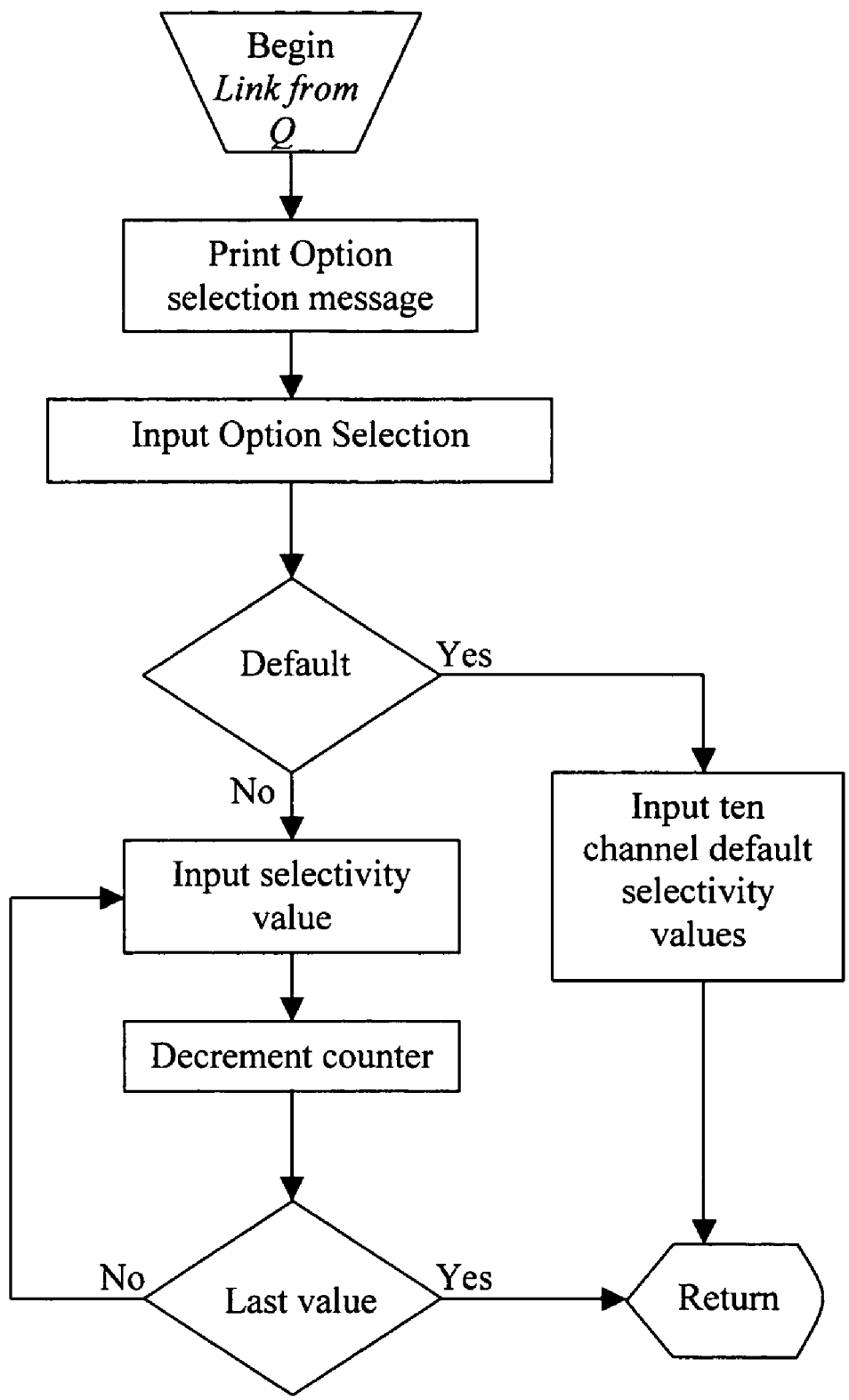
FIG. 5(o) is a program flowchart diagram illustrating a preferred method of implementing computer software code according to an embodiment of the invention.
Figure 5P:
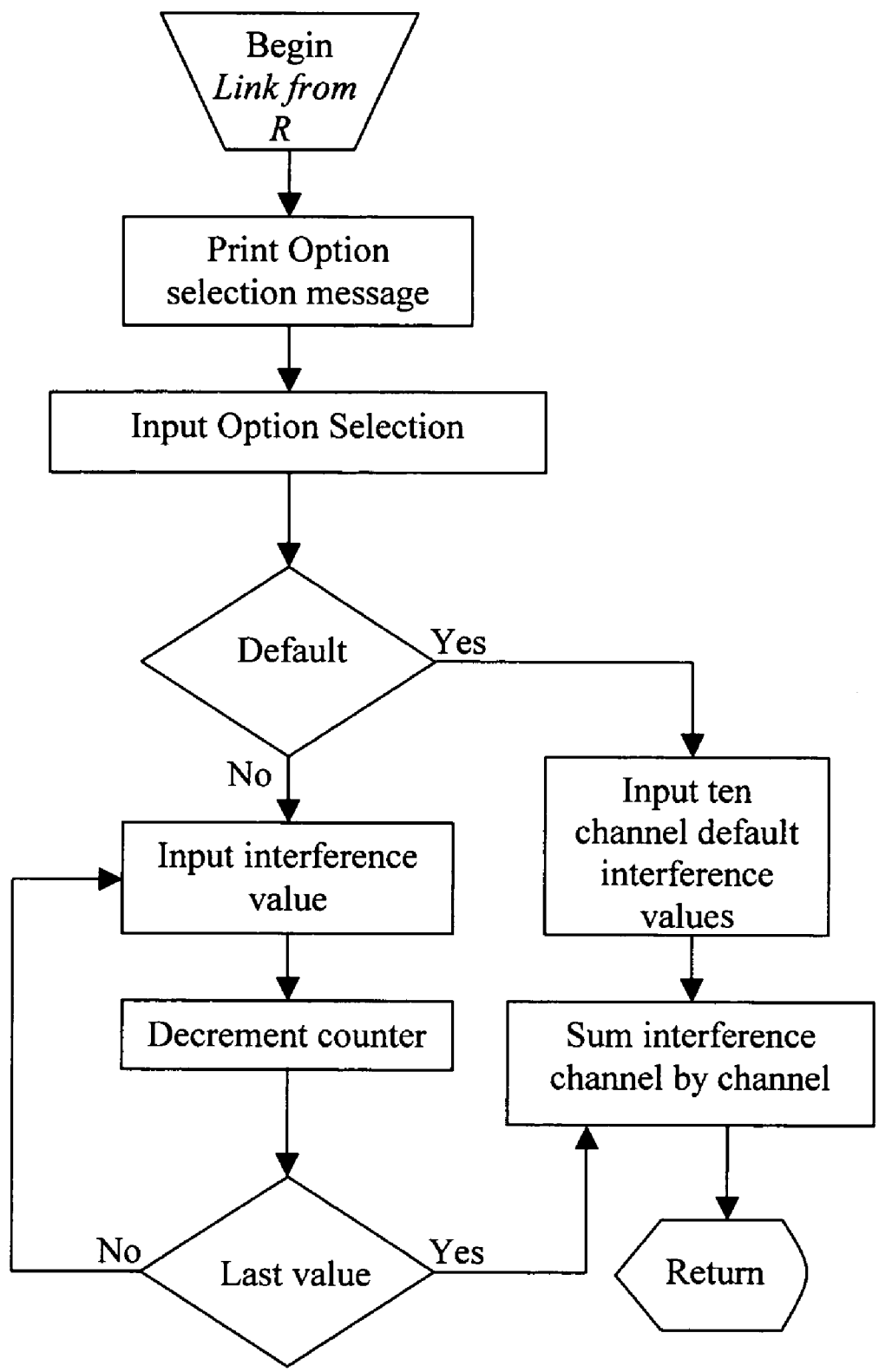
FIG. 5(p) is a program flowchart diagram illustrating a preferred method of implementing computer software code according to an embodiment of the invention.
Figure 5Q:
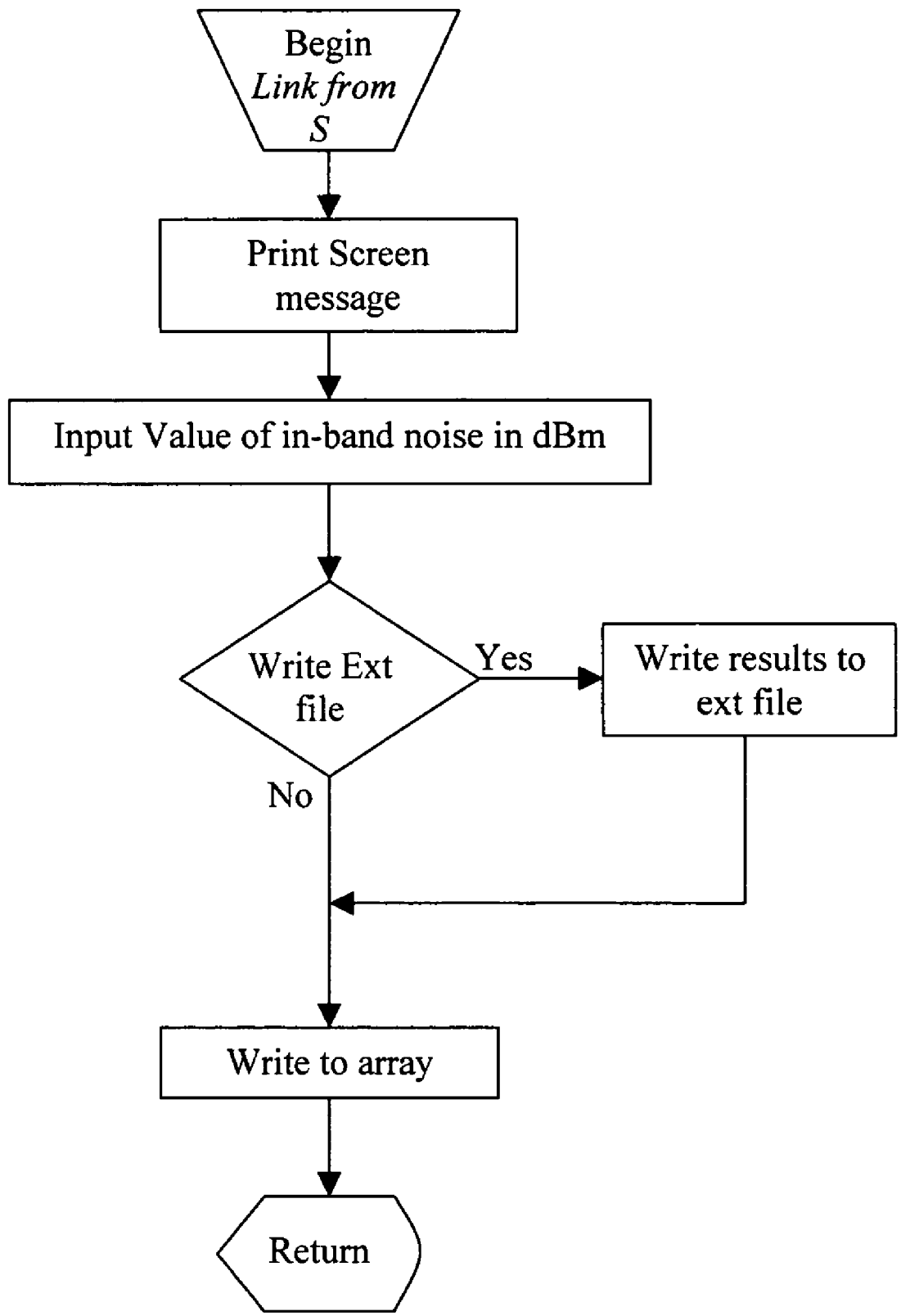
FIG. 5(q) is a program flowchart diagram illustrating a preferred method of implementing computer software code according to an embodiment of the invention.

A representative hardware environment for practicing the present invention is depicted in FIG. 4, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 1 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

The computer software implementing the method of the invention may be generated using the model presented in FIGS. 5(*a*) through 5(*q*). In the several flow diagrams, italics provide links to (and from) corresponding steps in the other flow diagrams. In FIG. 5(*a*), a general outline is provided for the performance prediction analysis provided by the invention. Once the process ends, the flow diagram links B to FIG. 5(*b*), which illustrates the logic of the end of the software coding for that section of the method. Moreover, FIG. 5(*a*) also links A to FIG. 5(*c*), which illustrates the general connectivity model for the invention. Within this model, a link C is given to FIG. 5(*d*), which provides the selection of the noise methodology implemented by the invention. Once the user inputs the noise methodology then a link H is provided to FIG. 5(*e*), which allows the user the ability to enter the noise program provided by the invention. FIG. 5(*e*) illustrates the RF background noise estimation methodology according to the invention. More specifically, the commands for implementing the RF background noise estimation methodology are further illustrated in FIG. 5(*f*), which provides several links: I, J. K, and L to other processes. For example, link I refers to the selection of the starting default parameters entered into the software, which is further illustrated in FIG. 5(*g*). Link K refers to FIG. 5(*h*), which describes the write commands outputted by the software. Link L refers to FIG. 5(*i*), which describes the command sequence for allowing the user to enter a "new problem" (i.e., once results are obtained for one estimation, the user may proceed with obtaining results for another estimation), or simply the user may choose to terminate the program. Within FIG. 5(*i*), there is a link M to FIG. 5(*j*), which describes this choice of either starting a new problem or ending the program in terms of the message provided to the user.

Referring once again to FIG. 5(*f*) one more link J is provided therein and this refers to FIG. 5(*k*), which describes the internal and external noise detection sequence and combination thereof. Within FIG. 5(*k*) link N indicates the sequence of determining the amplifier temperature, which is illustrated in FIG. 5(*l*). Also, FIG. 5(*k*) links to O shown in FIG. 5(*m*), which describes the internal noise and external noise combination methodology. As shown in FIG. 5(*m*) a link P is provided to FIG. 5(*n*) detailing the selectivity portion of the invention. This sub-process includes several links: Q, R, and S to other processes. Link Q refers to FIG. 5(*o*), which describes the loading of the selectivity methodology according to the invention. Link R refers to FIG. 5(*p*), which describes the loading of the interference methodology according to the invention. Finally, Link S refers to FIG. 5(*q*), which further describes the selectivity sub-process as implemented by the computer software code according to the invention.

The invention has several advantages. The invention provides a coherent and reasonable method of estimating the RF noise environment for any given radio receiver. Moreover, experimental tests have studied the validity of the invention's method, and have found that the resulting values of the RF noise determined by the invention have been accurately and, in some cases, exactly predicted. For example, the RF noise estimation process provided by the invention may be applied to GPS systems to predict the maximum receiver S/N. In fact, experimental testing in this environment has been successful, as the estimate of N was determined to be correct.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method of estimating radio frequency background noise in a radio receiver system, said method comprising:
    (a) determining a total receiver front-end noise based on a noise equivalent receiver bandwidth;
    (b) estimating an external noise associated with said radio receiver system;
    (c) determining an internal noise associated with said radio receiver system from a known noise value;
    (d) combining said external noise with said internal noise;
    (e) determining an absolute external radio frequency background noise floor associated with said radio receiver system;
    (f) estimating an out of band noise contribution based on radio receiver selectivity and known received noise levels of out of band sources;
    (g) generating a radio frequency noise estimate in said radio receiver system based on the steps (a) through (f)
    (h) utilizing a selectivity value of said radio receiver system;
    (i) utilizing known input noise values of radio frequency sources; and
    (j) combining said selectivity value and said known input noise values to generate said radio frequency noise estimate in said radio receiver system.

2. A computing system for estimating radio frequency background noise in a radio receiver system comprising:
    (a) means for determining a total receiver front-end noise based on a noise equivalent receiver bandwidth;
    (b) means for estimating an external noise associated with said radio receiver system;
    (c) means for determining an internal noise associated with said radio receiver system from a known noise value;
    (d) means for combining said external noise with said internal noise;
    (e) means for determining an absolute external radio frequency background noise floor associated with said radio receiver system;
    (f) means for estimating an out of band noise contribution based on radio receiver selectivity and known received noise levels of out of band sources;
    (g) means for generating a radio frequency noise estimate in said radio receiver system based on (a) through (f)
    (h) means for utilizing a selectivity value of said radio receiver system;
    (i) means for determining utilizing known input noise values of radio frequency sources; and
    (j) means for combining said selectivity value and said known input noise values to generate said radio frequency noise estimate in said radio receiver system.

3. A program storage device readable by computer, tangibly embodying a program of instructions executable by said computer to perform a method of estimating radio frequency background noise in a radio receiver system, said method comprising:
    (a) determining a total receiver front-end noise based on a noise equivalent receiver bandwidth;
    (b) estimating an external noise associated with said radio receiver system;
    (c) determining an internal noise associated with said radio receiver system from a known noise value;
    (d) combining said external noise with said internal noise;
    (e) determining an absolute external radio frequency background noise floor associated with said radio receiver system;
    (f) estimating an out of band noise contribution based on radio receiver selectivity and known received noise levels of out of band sources;
    (g) generating a radio frequency noise estimate in said radio receiver system based on the steps (a) through (f)
    (h) utilizing a selectivity value of said radio receiver system;
    (i) utilizing known input noise values of radio frequency sources; and
    (j) combining said selectivity value and said known input noise values to generate said radio frequency noise estimate in said radio receiver system.

* * * * *